(12) United States Patent
Chen et al.

(10) Patent No.: US 11,158,141 B2
(45) Date of Patent: Oct. 26, 2021

(54) SYSTEM AND METHOD FOR PROACTIVE VEHICLE DIAGNOSIS AND OPERATIONAL ALERT

(71) Applicant: Innova Electronics Corporation, Irvine, CA (US)

(72) Inventors: Ieon C. Chen, Irvine, CA (US); Hoa Khanh Chau, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 483 days.

(21) Appl. No.: 16/189,426

(22) Filed: Nov. 13, 2018

(65) Prior Publication Data

US 2019/0304213 A1 Oct. 3, 2019

Related U.S. Application Data

(60) Provisional application No. 62/651,567, filed on Apr. 2, 2018, provisional application No. 62/658,987, filed on Apr. 17, 2018.

(51) Int. Cl.
| | |
|---|---|
| *G07C 5/00* | (2006.01) |
| *G07C 5/08* | (2006.01) |
| *B60W 50/14* | (2020.01) |
| *B60W 50/02* | (2012.01) |

(52) U.S. Cl.
CPC ....... *G07C 5/0808* (2013.01); *B60W 50/0205* (2013.01); *B60W 50/14* (2013.01); *G07C 5/008* (2013.01); *G07C 5/0833* (2013.01); *B60W 2050/143* (2013.01)

(58) Field of Classification Search
None
See application file for complete search history.

(56) References Cited

U.S. PATENT DOCUMENTS

| | | |
|---|---|---|
| 6,330,499 B1 | 12/2001 | Chou et al. |
| 6,668,219 B2 | 12/2003 | Hwang et al. |
| 6,701,233 B2 | 3/2004 | Namaky et al. |
| 7,920,944 B2 | 4/2011 | Gould et al. |
| 8,428,811 B2 | 4/2013 | Cahill et al. |
| 8,600,610 B2 | 12/2013 | Bertosa et al. |

(Continued)

FOREIGN PATENT DOCUMENTS

WO 2018016934 A1 1/2018

*Primary Examiner* — James M McPherson
(74) *Attorney, Agent, or Firm* — Stetina Brunda Garred and Brucker; Mark B. Garred

(57) ABSTRACT

A system for providing vehicle information to a user via audible signals. The system includes a data acquisition and transfer device disposable in communication with a vehicle computer on a vehicle to receive diagnostic data therefrom. A remote diagnostic server is disposable in communication with the data acquisition and transfer device to receive the diagnostic data. The remote diagnostic server includes a plurality of preset vehicle conditions stored thereon, and is operative to analyze the diagnostic data and generate an alert signal when the diagnostic data represents at least one of the preset vehicle conditions. The alert signal is receivable by a mobile communication device and is configured to allow the mobile communication device to generate an audible signal based on the alert signal. The audible signal includes diagnostic information associated with the diagnostic data received from the vehicle computer.

41 Claims, 8 Drawing Sheets

(56) References Cited

U.S. PATENT DOCUMENTS

| | | |
|---|---|---|
| 8,798,808 B2 | 8/2014 | Gatti et al. |
| 8,811,008 B2 | 8/2014 | Selkirk et al. |
| 9,183,681 B2 | 11/2015 | Fish |
| D745,029 S | 12/2015 | Gray et al. |
| D746,316 S | 12/2015 | Gray et al. |
| D746,323 S | 12/2015 | Gray et al. |
| 9,213,332 B2 | 12/2015 | Fish et al. |
| D747,734 S | 1/2016 | Gray et al. |
| 9,245,394 B2 | 1/2016 | Park |
| D749,623 S | 2/2016 | Gray et al. |
| 9,262,254 B2 | 2/2016 | Bertosa et al. |
| 9,292,977 B2 | 3/2016 | Bertosa et al. |
| D757,059 S | 5/2016 | Gray et al. |
| 9,329,633 B2 | 5/2016 | Selkirk et al. |
| 9,367,968 B2 | 6/2016 | Giraud et al. |
| 9,443,360 B1 | 9/2016 | Kwak |
| D770,462 S | 11/2016 | Gray et al. |
| 9,488,116 B2 | 11/2016 | Mosher et al. |
| 9,646,427 B2 | 5/2017 | Chen et al. |
| 9,858,731 B2 | 1/2018 | Fish et al. |
| 9,875,583 B2 | 1/2018 | Prokhorov |
| 9,904,634 B2 | 2/2018 | Case, Jr. et al. |
| 10,295,333 B2 | 5/2019 | Fish et al. |
| 10,467,906 B2 | 11/2019 | Fish et al. |
| 2008/0140281 A1 | 6/2008 | Morris et al. |
| 2012/0029762 A1* | 2/2012 | Ubik ............... G07C 5/008 701/29.6 |
| 2013/0110344 A1* | 5/2013 | Merg ............... G07C 5/0825 701/31.4 |
| 2014/0195100 A1* | 7/2014 | Lundsgaard ........ G06Q 50/30 701/29.6 |
| 2014/0244110 A1* | 8/2014 | Tharaldson ........ G06Q 50/01 701/36 |
| 2014/0297097 A1 | 10/2014 | Hurwitz |
| 2017/0186054 A1 | 6/2017 | Fish et al. |
| 2018/0072250 A1* | 3/2018 | Kim ............ H04L 12/40006 |
| 2018/0101775 A1 | 4/2018 | Fish |
| 2019/0108691 A1* | 4/2019 | Tucker ............ G05B 23/0232 |

\* cited by examiner

SYSTEM AND METHOD FOR PROACTIVE VEHICLE DIAGNOSIS AND OPERATIONAL ALERT

CROSS-REFERENCE TO RELATED APPLICATIONS

This application claims the benefit of U.S. Provisional Application No. 62/651,567, filed Apr. 2, 2018 and entitled ARTIFICIAL INTELLIGENCE VIRTUAL ASSISTANT AS USER INTERFACE TO OBTAIN VEHICLE DIAGNOSTIC DATA, and U.S. Provisional Application No. 62/658,987, filed Apr. 17, 2018 and entitled SYSTEM AND METHOD FOR NETWORK SCAN OF VEHICLE CONTROL MODULES OF NON-MOVING VEHICLES, the contents of both of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a proactive vehicle alert system, and more specifically to a system capable of retrieving data from a vehicle when certain driving conditions are met, analyzing the data at a remote diagnostic server, and providing a verbal alert to the driver in language understandable by the driver.

2. Description of the Related Art

Modern vehicles include a network of electronic systems and control modules, which may be associated with several different aspects of the vehicle, such as the powertrain, braking, steering, suspension, climate control, lighting, entertainment, communications, or navigation. A network scan may refer to the process of communicating with the various control units or modules on a particular vehicle to identify any faults that may be present or to identify the status of the various modules. A network scan may be completed by scan tool designed to interface with the vehicle via a diagnostic port on the vehicle.

While a conventional scan tool is typically capable of retrieving basic diagnostic data, a drawback commonly associated with scan tools is that scan tools may require prompting by the driver/user to use the scan tool for retrieving the information. For instance, a diagnostic trouble code (DTC) may be generated by the vehicle and remain undetected until the driver uses the scan tool to retrieve the trouble code. If the driver has not noticed any symptoms or problems with the vehicle, it is likely that the driver will forgo the scan. Over time, the underlying diagnostic issue which prompted the DTC may give rise to a larger diagnostic problem if not resolved quickly. As such, conventional scan tools may suffer from requiring prompting by the user.

Conventional scan tools may also suffer from a limited ability to provide information to a driver while driving the vehicle. For instance, during a road trip, a driver may be concerned with real-time operational conditions, such as whether the vehicle has enough fuel to reach a specific destination. If such a question arises during a trip, a driver may be required to pull over and estimate a driving range based on the current fuel levels, and then compare to an estimated remaining trip mileage. If fuel is needed, the driver may be required to look up nearby gas stations to refuel. This process may disrupt the trip and add to the overall drive time.

Another deficiency associated with the use of conventional scan tools relates to the comprehensive retrieval of diagnostic data from the vehicle. One challenge is that there is no widely known universal list of control modules for each vehicle type, as well as there is no widely known universal naming convention for modules. As such, it may be difficult to identify a particular system of interest, and thus, a scan tool may be required to scan all available modules to retrieve data from a particular module of interest.

A further challenge associated with conventional scan tools is that accessing certain systems or modules on the vehicle may interfere with the normal operation of the vehicle. As a result, many scan tools, particularly those marketed toward do-it-yourself, non-mechanics, may not be configured to allow a user to access certain control systems or modules, and thus, many scan tools do not facilitate a comprehensive diagnostic scan of a vehicle.

In addition to the challenges associated with accessing the data on the vehicle, there may be challenges in communicating the data to a user in an understandable format. Along these lines, diagnostic data, such as DTCs, may be provided by the vehicle in an alphanumeric format. For instance, a vehicle may output diagnostic trouble code P0128, which may refer to a problem in the coolant thermostat. However, if an average driver was provided with the code P0128 by itself, the driver may not understand the meaning behind the code, which may lead to confusion. The average driver may be required to research the meaning behind the code, which may take time the driver may not have. Furthermore, simply decoding the DTC may not identify the underlying diagnostic condition which triggered the DTC. Additional diagnosis may be required by an automotive professional to associate the diagnostic trouble code with the underlying cause.

Accordingly, there is a need in the art for diagnostic system capable of proactively retrieving diagnostic data from a vehicle in a safe manner, analyzing the diagnostic data, and conveying a diagnostic solution to the user in easy to understand terminology. Various aspects of the present disclosure address this particular need, as will be discussed in more detail below.

BRIEF SUMMARY

In accordance with one embodiment of the present disclosure, there is described a system for providing vehicle information to a user via audible signals, with the system being configured for use with a vehicle and a mobile communication device. The system includes a data acquisition and transfer device disposable in communication with a vehicle computer on a vehicle to receive diagnostic data therefrom. A remote diagnostic server is disposable in communication with the data acquisition and transfer device to receive the diagnostic data from the data acquisition and transfer device. The remote diagnostic server includes a plurality of preset vehicle conditions stored thereon and is operative to analyze the diagnostic data and generate an alert signal when the diagnostic data represents at least one of the preset vehicle conditions. The mobile communication device may be operative to generate an audible signal in response to receipt of the alert signal. The audible signal includes diagnostic information associated with the received diagnostic data.

At least one of the plurality of preset vehicle conditions stored on the remote diagnostic server may include an operable range for a vehicle operational condition. The vehicle operational condition may relate to a level of gas in a gas tank on the vehicle, and the operable range may include a predefined level of gas under a maximum threshold. At least one of the plurality of preset vehicle conditions stored on the remote diagnostic server may include a preset battery level for a vehicle battery.

The remote diagnostic server may be capable of determining the plurality of preset vehicle conditions based on vehicle identification information associated with the vehicle. The data acquisition device may be capable of receiving the vehicle identification information from the vehicle computer and communicating the vehicle identification information to the remote diagnostic server.

The audible signal may include voice alerts in a prescribed language selected by a user.

The automotive diagnostic system may further comprise a voice conversion tool disposable in communication with the remote diagnostic server to receive the alert signal and convert the alert signal from a digital format to a voice format to facilitate generation of the audible signal by the mobile communication device.

The data acquisition and transfer device may be configured to determine whether the vehicle is stationary when the data acquisition and transfer device is disposed in communication with the vehicle computer, and transmit a data request signal to the vehicle computer to request the diagnostic data in response to a determination that the vehicle is stationary.

The data acquisition and transfer device may be configured to receive operational data from the vehicle computer and determine whether the vehicle is stationary based on the received operational data. The operational data may be speed data from the vehicle.

The data acquisition and transfer device may include a motion sensor to detect a status of the data acquisition and transfer device as being one of a moving status and a non-moving status in response to the data acquisition and transfer device being in communication with the vehicle computer. The motion sensor may include an accelerometer. The data acquisition and transfer device may be operative to generate a request signal only when the sensor detects the status as being the non-moving status, with the diagnostic data being received by the data acquisition and transfer device in response to generation of the request signal. The data acquisition and transfer device may be configured to transmit a request signal to the vehicle computer in response to a detected transition on the status from the moving status to the non-moving status.

The data acquisition and transfer device may be configured to transmit a data request signal in response to receipt of an instructional signal from the mobile communication device.

The data acquisition and transfer device may include a long range communication circuit for communicating with the remote diagnostic server via a cellular network, or a short range communication circuit for communicating with the remote diagnostic server via the mobile communication device.

According to another embodiment, there may be a method for providing vehicle information to a user via audible signals. The method may include receiving diagnostic data at a data acquisition and transfer device from a vehicle computer on a vehicle. The method may further include transferring the diagnostic data to a remote diagnostic server having a plurality of preset vehicle conditions stored thereon. The diagnostic data may be analyzed at the remote diagnostic server and an alert signal may be generated when the diagnostic data satisifies at least one of the preset vehicle conditions. The method may additionally include transmitting the alert signal to a mobile communication device, with the mobile communication device being configured to generate the audible signal in response to receipt of the alert signal. The audible signal includes diagnostic information associated with the diagnostic data received from the vehicle computer.

The method may include receiving vehicle identification information associated with the vehicle at the remote diagnostic server and determining the plurality of preset vehicle conditions at the remote diagnostic server based on the received vehicle identification information.

The method may further comprise the step of receiving the alert signal at a voice conversion tool and converting the alert signal from a digital format to a voice format to facilitate generation of the audible signal by the mobile communication device.

The method may further include determining at the diagnostic acquisition and transfer device whether the vehicle is stationary when the data acquisition and transfer device is disposed in communication with the vehicle computer, and transmitting a data request signal to the vehicle computer to request the diagnostic data in response to a determination that the vehicle is stationary.

The method may also comprise the steps of receiving operational data at the data acquisition and transfer device from the vehicle and determining whether the vehicle is stationary based on the received operational data.

The method may further include the steps of detecting a status of the data acquisition and transfer device using a sensor on the data acquisition and transfer device, with the status being one of a moving status and a non-moving status when the data acquisition and transfer device is disposed in communication with the vehicle computer. The may additionally include the step of generating a request signal by the data acquisition and transfer device only when the sensor detects the status as being the non-moving status, with the diagnostic data being received by the data acquisition and transfer device in response to generation of the request signal.

The method may also include the step of transmitting a data request signal from the data acquisition and transfer device to the vehicle computer in response to receipt of an instructional signal on the data acquisition and transfer device from the mobile communication device.

The method may include the step of determining whether the vehicle is stationary, and the transmitted alert signal may include instructions to limit generation of the audible signal only when the vehicle is determined to be stationary.

The transmitted alert signal may be associated with one of a non-urgent indicator and an urgent indicator. The method may include determining whether the vehicle is stationary, with the generation of the audible signal being limited to when the vehicle is stationary when the alert signal is associated with the non-urgent indicator, and the generation of the audible signal proceeding independent of the determination of whether the vehicle is stationary when the alert signal is associated with the urgency indicator.

According to another embodiment, there may be provided a diagnostic method for use with a vehicle having an electronic control unit (ECU) in communication with a plurality of vehicle systems. The vehicle is operable so as to be associated with a moving status when the vehicle is moving and a non-moving status when the vehicle is stationary. The diagnostic method includes establishing an initial data link between a diagnostic data acquisition and transfer device, e.g., a dongle, and the ECU via a diagnostic port on the vehicle. A request is transmitted from the data acquisition and transfer device to the ECU via the initial data link for a systems list including the plurality of vehicle systems from the ECU. A system data link is established between the diagnostic data acquisition and transfer device and a system of interest, with the system of interest being one of the plurality of vehicle systems included on the systems list. Initial status data is received at a processor on the diagnostic data acquisition and transfer device, with the initial status data being associated with operation of the vehicle. The method further includes analyzing the initial status data using the processor on the diagnostic data acquisition and transfer device to determine an operational status of the vehicle as being one of the moving status and the non-moving status. The system data link with the system of interest is terminated when the operational status is determined to be the moving status. The method additionally includes receiving subsequent status data at the processor on the diagnostic data acquisition and transfer device, with the subsequent status data being associated with operation of the vehicle subsequent to receipt of the initial status data. The subsequent status data is analyzed using the processor on the diagnostic data acquisition and transfer device to determine the operational status of the vehicle as being one of the moving status and the non-moving status. The method further comprises re-establishing the system data link with the system of interest when the operational status is determined to be the non-moving status based on the analysis of the subsequent status data.

The method may include the step of receiving vehicle identification information from the ECU in response to establishing the initial data link.

Several steps of the diagnostic method may proceed autonomously or independent of user intervention. For instance, the steps of establishing the initial data link, transmitting a request from the data acquisition and transfer device to the ECU via the initial data link, establishing a systems data link, receiving initial status data, analyzing the initial status data, terminating the systems data link, receiving subsequent status data, analyzing the subsequent status data, and re-establishing the system data link may proceed independent of user intervention.

The method may additionally include the step of determining the system or systems of interest based on a predetermined ranking of the plurality of vehicle systems.

The method may further comprise the steps of receiving a system data stream from the system of interest via the system data link while the system data link is established, and temporarily storing the received system data stream in a buffer database while the system data link is terminated. The method may also include creating a digital marker representative of that portion of the system data stream already received via the system data link prior to termination of the system data link, and generating a resume command based on the digital marker to resume the step of receiving the system data stream, in response to reestablishing the system data link with the system of interest, to receive a remaining portion of the system data stream yet to be received.

The method may also include uploading at least a portion of the system data stream to a remote diagnostic server. The method may further comprise the step of receiving a possible diagnostic solution from the remote diagnostic server in response to the uploaded system data stream. The method may additionally comprise requesting live data from the ECU and/or other vehicle systems, to verify a possible diagnostic solution(s). The method may further include transmitting the possible diagnostic solution to a preprogrammed electronic address, which may provide e-commerce functionality, e.g., to identify, indicate the price, and facilitate the sales activities associated with the diagnostic solution.

The method may also include generating an audible signal using a virtual assistant to communicate the possible diagnostic solution to a user.

The step of establishing an initial data link and all steps subsequent thereto may proceed autonomously in response to receipt by the DAT of a power signal from the ECU.

The method may include the step of requesting at least one of the initial status data and subsequent status data according to a preset schedule.

The method may additionally comprise the step of receiving a voice request from a user, and requesting at least one of the initial status data and the subsequent status data in response to receiving the voice request. All steps of the diagnostic method subsequent to receipt of the voice request may proceed autonomously in response to receipt of the voice request. For instance, the steps of analyzing the initial status data, terminating the system data link, receiving subsequent status data, analyzing the subsequent status data, and re-establishing the system data link may proceed autonomously in response to receipt of the voice request.

The receiving initial status data step may further include receiving at least one of data from a microphone, data from a GPS module, and data from an accelerometer.

According to another embodiment, the diagnostic method includes establishing an initial data link between a diagnostic data acquisition and transfer device and the ECU. A request is transmitted via the initial data link for a systems list including the plurality of vehicle systems from the ECU. A system data link is established between the diagnostic data acquisition and transfer device and a system of interest, with the system of interest being one of the plurality of vehicle systems included on the systems list. Initial status data is received at a processor on a mobile communication device, e.g., a smartphone, with the initial status data being associated with operation of the vehicle. The processor is in wireless communication with at least the dongle and/or the ECU.

The method further includes analyzing the initial status data using the processor on the smartphone to determine an operational status of the vehicle as being one of a moving status and a non-moving status. The system data link may be disabled or terminated when the operational status is determined to be the moving status based on the analysis of the initial status data. Subsequent status data may also be received at the processor on the smartphone, the subsequent status data being associated with operation of the vehicle subsequent to receipt of the initial status data. The subsequent status data may be analyzed, displayed, or responded to using the processor on the smartphone to determine the operational status of the vehicle as being one of the moving status and the non-moving status. The processor on the smartphone may implement functionality of a smartphone application stored on the smartphone. The system data link is re-established when the operational status is determined to be the non-moving status based on the analysis of the subsequent status data.

The receiving initial status data step may include receiving GPS data from a GPS circuit on the smartphone. The receiving initial status data step may include receiving microphone data from a microphone on the smartphone or other mobile communication device. The receiving initial status data step may include receiving accelerometer data from an accelerometer on the smartphone.

The method may further comprise the step of determining the system of interest based on a predetermined ranking of the plurality of vehicle systems. The predetermined rankings may be derived from accumulated repair statistics for similar vehicles and may further be ordered based upon a present diagnostic condition of the vehicle. The ranking methodology may be implemented at the remote diagnostic server.

According to yet another embodiment, a diagnostic data acquisition and transfer device is provided for use with a vehicle having a diagnostic port, and an electronic control unit (ECU) in communication with a plurality of vehicle systems. The vehicle is operable so to be associated with a moving status when the vehicle is moving and a non-moving status when the vehicle is stationary. The diagnostic data acquisition and transfer device comprises a data connector connectable with the diagnostic port to establish an initial data link between a diagnostic data acquisition and transfer device and the ECU, and a system data link between the diagnostic data acquisition and transfer device and a system of interest, with the system of interest being one of the plurality of vehicle systems. The diagnostic data acquisition and transfer device further includes a status determining circuit communicable with a status data source to receive status data associated with operation of the vehicle and determine an operational status of the vehicle, based on the status data, as being one of a moving status and a non-moving status. The data acquisition and transfer device additionally includes a communications control circuit in communication with the status determining circuit. The communications control circuit is operative to terminate the system data link when the operational status is determined to be the moving status, and re-establish the system data link when the operational status is determined to be the non-moving status.

The status data source may an accelerometer located within a housing of the diagnostic data acquisition and transfer device.

According to another aspect of the present disclosure there is provided an vehicle voice assistant system comprising a mobile electronic device having a microphone or other acoustic transponder for receiving a verbal request from a user and a transceiver for communicating the verbal request as a wireless request signal. The system may additionally include a voice conversion tool in operative communication with the mobile electronic device to receive the wireless request signal to derive a digital alert signal therefrom. The system may further include a data acquisition and transfer device operatively connectable to the vehicle ECU to facilitate data communication therebetween. The data acquisition and transfer device may additionally be in operative communication with the voice conversion tool to receive the digital alert signal therefrom, and request diagnostic data from the ECU in response to the digital alert signal.

Diagnostic data received from the ECU may be uploaded to the remote diagnostic server via the mobile electronic device for analysis to identify one or more possible diagnostic solutions. The remote diagnostic server may generate a data signal associated with the possible diagnostic solution, which may be communicated to the voice conversion tool. The voice conversation database may convert the data signal associated with the possible diagnostic solution into a voice signal which may be communicated to the mobile electronic device, for playback to the user.

According to another implementation, there is included a diagnostic system including computer readable instructions downloadable onto a handheld electronic device for configuring the handheld electronic device to implement one or more method steps described herein.

The computer readable instructions may further configure the handheld electronic device to autonomously perform the programming step, and all steps subsequent thereto, in response to the handheld electronic device receiving a wireless communication signal from the vehicle.

In yet a further embodiment, there is a diagnostic system including computer readable instructions downloadable onto a handheld communication device for configuring the handheld communication device to implement one or more method steps described herein. The computer readable instructions downloadable onto the handheld communication device may allow the handheld communication device to communicate directly with a vehicle computer, e.g., independent of a separate data acquisition and transfer device.

The computer readable instructions may further configure the handheld communication device to autonomously perform the step of establishing an initial data link, and all steps subsequent thereto, in response to the handheld communication device receiving a wireless communication signal from the vehicle.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Various aspects of the present disclosure are directed toward proactive vehicle diagnostic and evaluation systems and related methodologies, wherein diagnostic data may be autonomously accessed from a vehicle and uploaded to a remote database for evaluation. If the diagnostic data reveals a condition that should be communicated to the driver, such as the presence of a diagnostic trouble code (DTC)) or a low fuel level, a signal may be sent to the driver's smartphone, located in the vehicle. The smartphone may broadcast an alert to the driver in the driver's native language and in terminology that is easily understandable to the driver to make the driver aware of the identified diagnostic condition or operational condition. For instance, if the vehicle data includes a DTC associated with a loose gas cap, the smartphone may broadcast a signal such as, "Your gas cap is loose. Please pull over at your earliest convenience to tighten." In this respect, the system may function as a virtual assistant to the driver to provide the driver with updates during a trip.

Furthermore, certain data retrieved from the vehicle may include data that may only be safely accessible when the vehicle is not moving, such as when the vehicle is idling, so as not to interfere with the normal operation of the vehicle system being scanned for diagnostic data. Therefore, the system may be capable of detecting an operational status of the vehicle, such as determining whether the vehicle is moving or not moving, and only retrieve certain data when the determination is made that the vehicle is not moving. The system may refrain from establishing a data link, or may terminate or disable an existing data link when the diagnostic system detects that the vehicle is moving. When the system detects that the vehicle is not moving, the data link may be established (or re-established) to safely conduct the diagnostic scan. Thus, the system may ensure that data retrieval from one or more sensitive systems on the vehicle only occurs when the vehicle is in a non-moving operational state.

Figure 1:
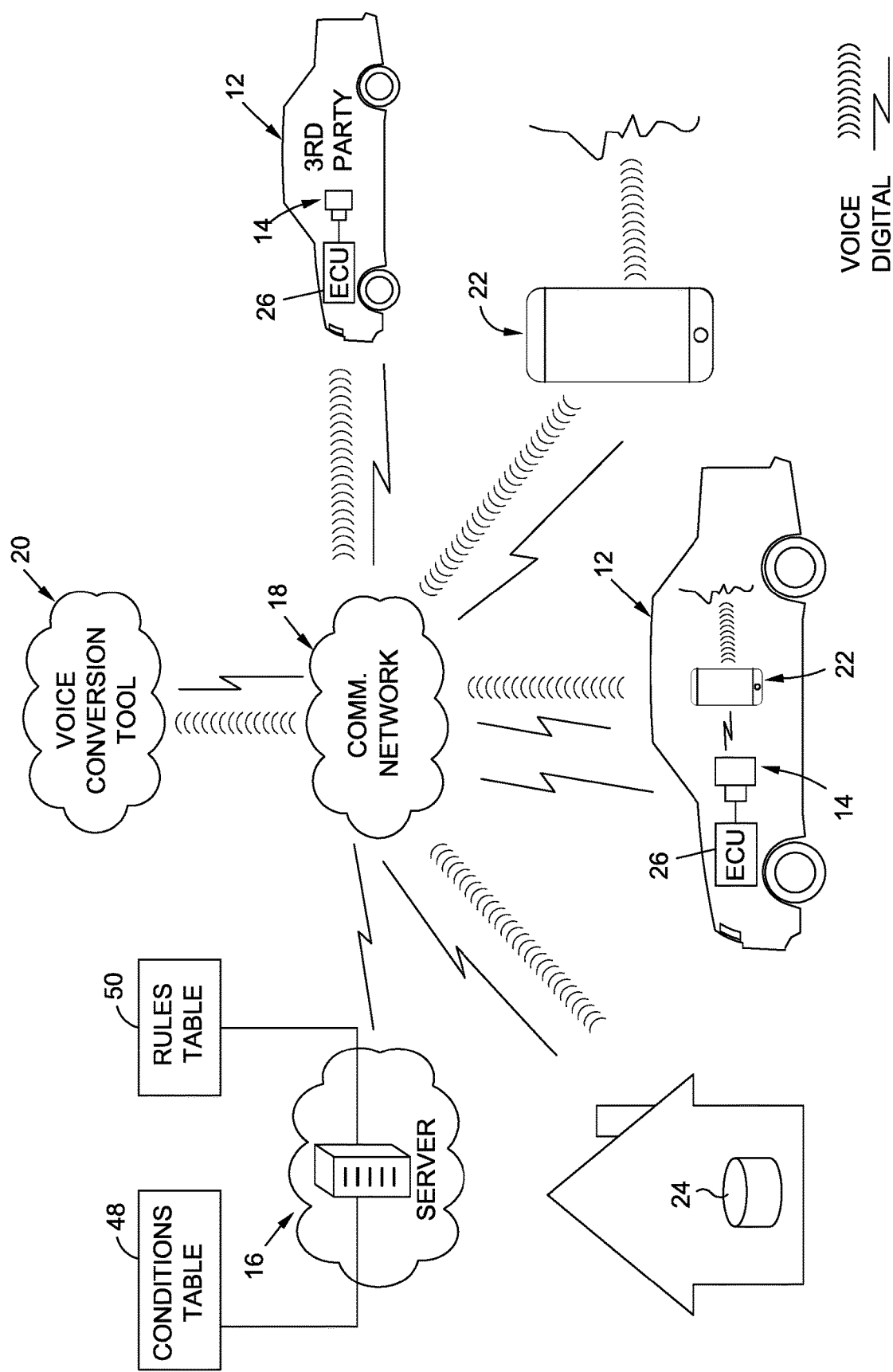
FIG. 1 is a schematic view of an interconnected system of electronic components for implementing a proactive virtual diagnostic alert system.
Figure 2:
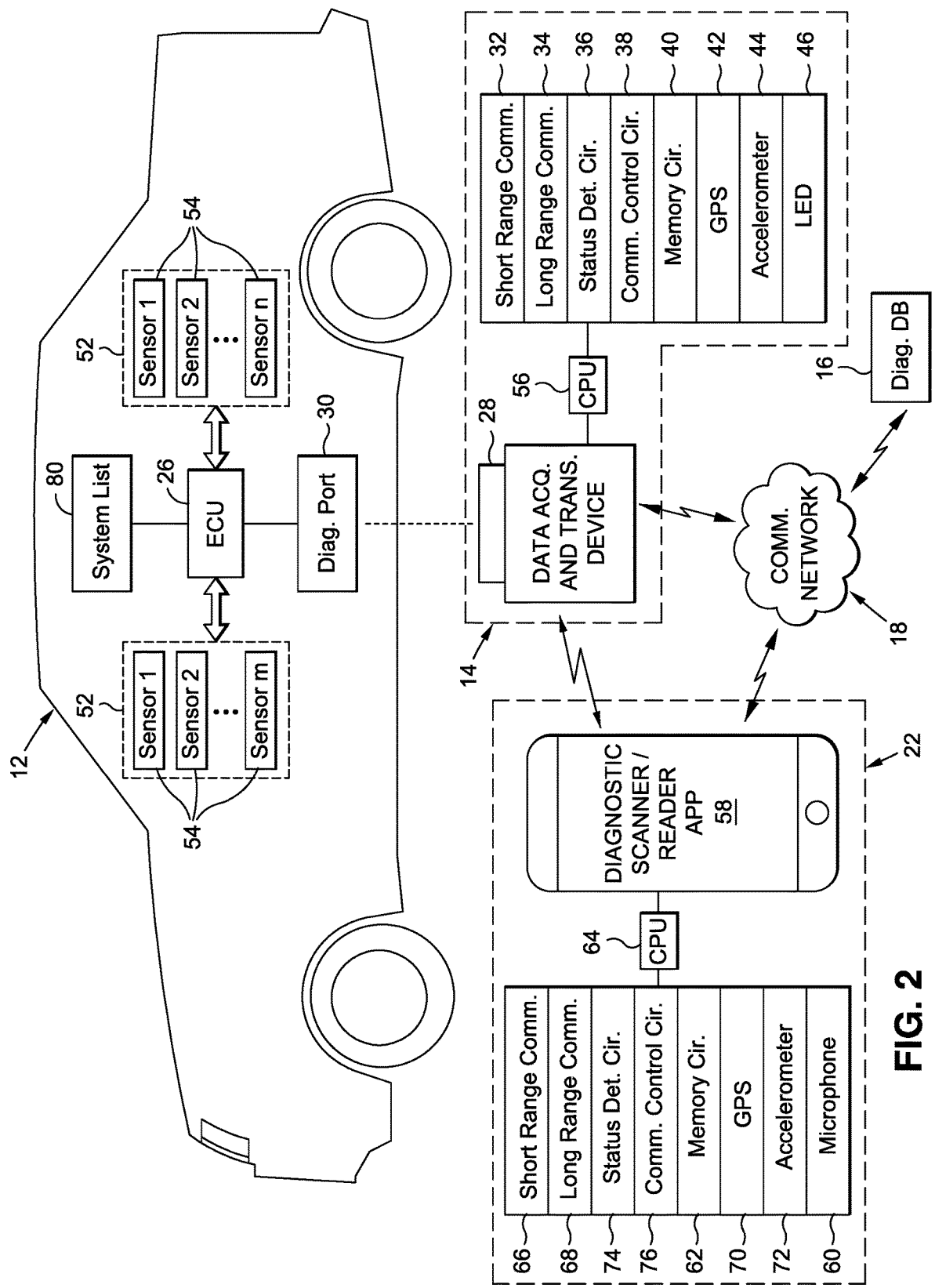
FIG. 2 is a schematic view of a vehicle diagnostic system include a data acquisition and transfer device and a smartphone.
Figure 3:
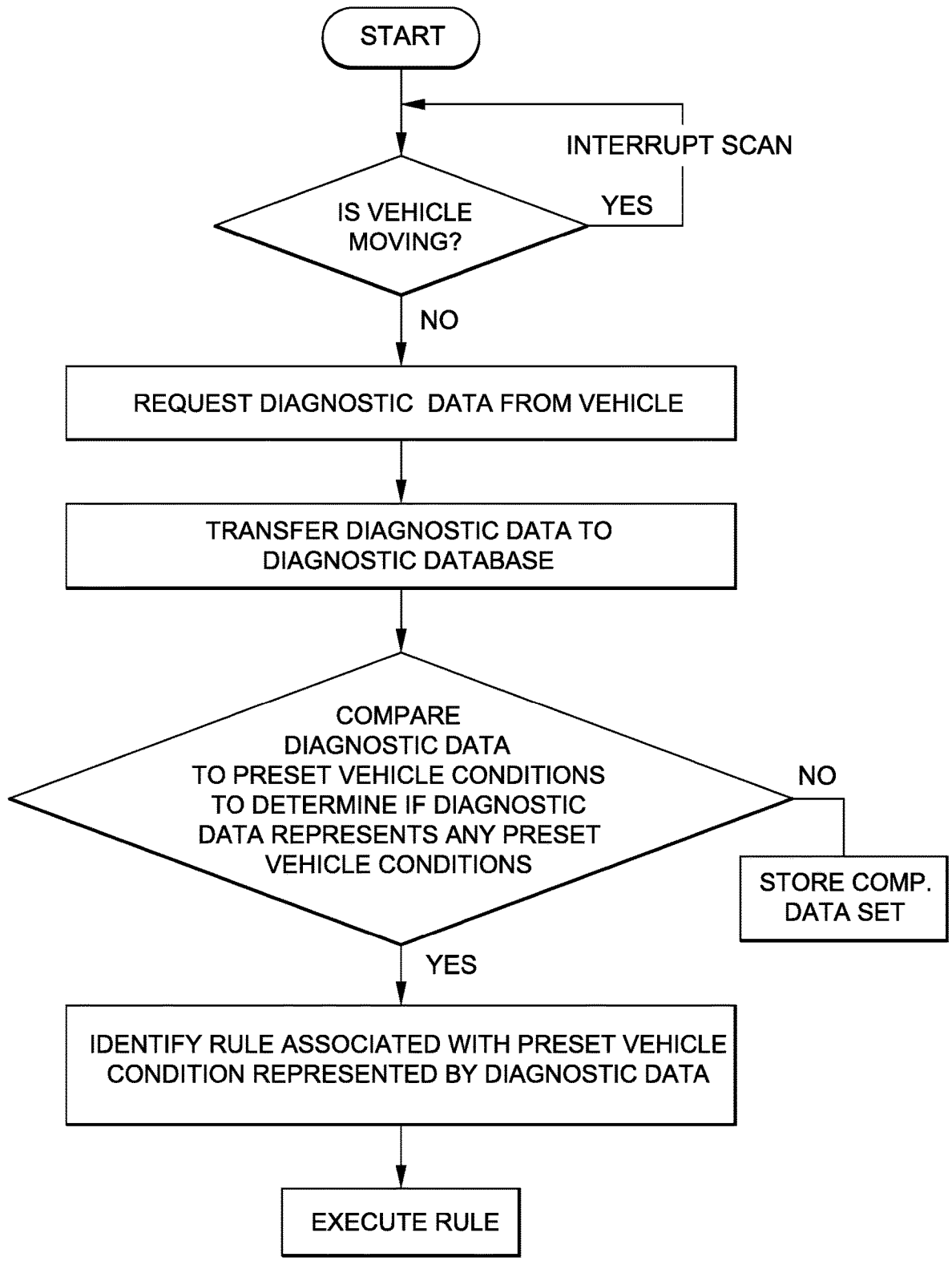
FIG. 3 is a flow chart illustrating an exemplary proactive diagnostic method.
Figure 4:
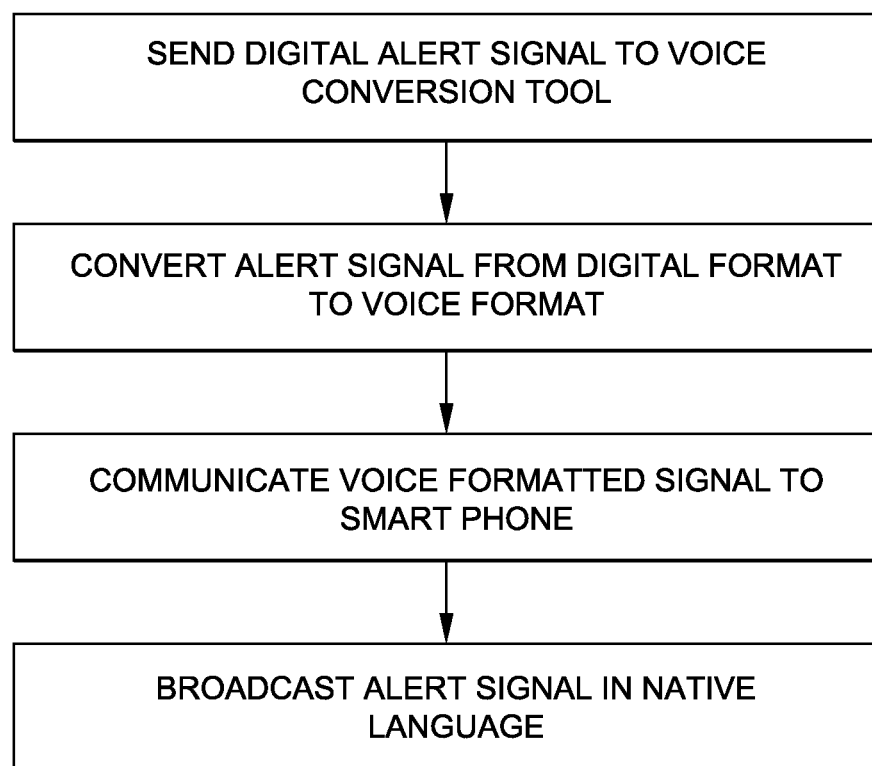
FIG. 4 is a flow chart illustrating the steps of converting an alert signal from a digital format to a voice format.

Referring now specifically to FIGS. 1 and 2, there is depicted a system 10 which facilitates the retrieval of data and information from one or more vehicles 12, as well as facilitating the communication of the data and information to one or more remote destinations. In general, the system 10 may include diagnostic data acquisition and transfer devices 14, and a remote diagnostic server 16. The diagnostic data acquisition and transfer devices 14 and the remote diagnostic server 16 may be in communication with a communication network 18, which may allow for interfacing with remote electronic devices, such as a voice conversion tool 20, mobile communication devices 22, e.g., handheld smartphones, and voice assistants 24, as will be described in more detail below. Although the exemplary embodiment shows the diagnostic data acquisition and transfer device 14 and the mobile communication device 22 as separate components, it is contemplated that they may be integrated into a single electronic device capable of performing the functionalities of the data acquisition and transfer device (e.g., communicating with a vehicle computer), and the mobile communication device 22 (e.g., performing long range wireless communication). Furthermore, such single electronic device may also be capable of performing the functionalities of the voice assistant, as described herein.

The diagnostic data acquisition and transfer device 14 is configured to interface with an electronic control unit (ECU) 26 on a vehicle 12 to retrieve data from the vehicle 12. The diagnostic data acquisition and transfer device 14 may broadly refer to a diagnostic dongle, code reader, scan tool, or other hardware, to facilitate the retrieval of diagnostic data, operational data, or vehicle information from the ECU 26. In the exemplary embodiment, the diagnostic data acquisition and transfer device 14 is embodied as a diagnostic dongle, and thus, the following discussion refers to the diagnostic data acquisition and transfer device 14 as a diagnostic dongle.

Referring now specifically to FIG. 2, there is depicted a more detailed view of the diagnostic dongle 14, and its interaction with the ECU 26, as well as a nearby mobile communication device 22. The diagnostic dongle 14 may include a data connector 28 connectable with the diagnostic port 30 on the vehicle 12 to facilitate data communication between the ECU 26 and the dongle 14. The diagnostic dongle 14 may additionally include a short range wireless communication circuit 38 as well as a long range wireless communication circuit 34. The short range wireless communication circuit 38 may allow for wireless communication between the dongle 14 and other electronic devices in the vehicle 12, such as a user's smartphone 22. In this respect, the short range wireless communication circuit 38 may communicate via Bluetooth™, WiFi™, or other short-range communication protocols known in the art. The long range wireless communication circuit 34 may allow for wireless communication with the remote diagnostic server 16 or a remote electronic device, such as a remote smartphone 22. The long-range communication circuit 34 may allow for wireless communication over the communication network 18. It is contemplated that the long-range communication circuit 34 may require a separate data plan through a wireless communication carrier, and thus, the long-range communication circuit 34 may be optional. In one embodiment, the long-range communication circuit 34 may be limited to wireless communication of digital signals (as opposed to voice signals), to minimize the requirements of the long-range communication circuit 34. However, it is contemplated that in other embodiments, the long-range communication circuit 34 may be capable of communicating wireless signals in both digital format, as well as voice format.

The dongle 14 may additionally include a status determination circuit 36, a communication control circuit 38, a memory circuit 40, a GPS device 42, an accelerometer 44, and one or more LEDs 46, the purposes of which will be described in more detail below.

The dongle 14 may receive different types of data from the ECU 26 including, but not limited to, vehicle identification information and diagnostic data. The vehicle identification information may include an electronic vehicle identification number (VIN), as well as information regarding the year, make, model, and engine of the vehicle 12. The vehicle identification information may be used by the dongle 14 to determine communication protocols of the vehicle 12 and the systems or components thereon, as well as to identify any diagnostic rules or information that may be specific to the vehicle 12. The diagnostic data may include diagnostic trouble codes (DTC), sensor data, live data, freeze frame data, system data, etc., that may be trigger, or may be indicative of a problem with the vehicle 12. The diagnostic data may additionally include information that varies during operation of the vehicle 12, such as speed, rpm, mileage, tire pressure, engine temperature, oil life, gas level, battery life, routing information, brake shoe condition, etc. For instance, speed data may be obtained by reading the vehicle computer speed parameter ID (PID).

The dongle 14 may be configured to receive certain types of information or data when the vehicle 12 is stopped, while other types of information or data may be received at any time, e.g., when the vehicle 12 is in motion or when the vehicle 12 is stopped. According to one embodiment, the dongle 14 may receive at least some diagnostic data when the vehicle 12 is in motion, while other diagnostic data may be received when the vehicle 12 is stopped. The following discussion will refer to the diagnostic data that may be received at any time as non-disruptive diagnostic data, while the diagnostic data that may only be safely accessed when the vehicle is stopped as sensitive diagnostic data. For instance, in one implementation, the non-disruptive diagnostic data may include vehicle speed data, while the sensitive diagnostic data may include any DTCs that have been triggered along with the mileage when the vehicle 12 stops. As used herein, the term sensitive diagnostic data may refer to diagnostic data that may be safely retrieved when the vehicle 12 is not in motion, but may cause disruption in vehicle operation if retrieved when the vehicle 12 is in motion.

The sensitive diagnostic data received by the dongle 14 may be uploaded to the remote diagnostic server 16 for analysis. In one embodiment, the dongle 14 utilizes its long-range communication circuit 34 to facilitate the upload of the sensitive diagnostic data to the remote diagnostic server 16, while in other embodiments, the sensitive diagnostic data may be uploaded to the remote diagnostic server 16 via the driver's smartphone 22. When the smartphone 22 is used, the dongle 14 may transfer the sensitive diagnostic data to the smartphone 22 via the short-range communications circuit 32, with the smartphone 22 then uploading the diagnostic data to the remote diagnostic server 16.

The dongle 14 may be in wireless communication with the driver's smartphone 22, which may include a display screen 58 for displaying data or information related to the vehicle 12. The smartphone 22 may additionally include a microphone 60 to receive verbal commands from the user, as well as to detect ambient sounds associated with the vehicle 12, such as a user opening and closing doors, engine sounds, and vehicle vibrations. The smartphone 22 may also include a memory circuit 62 for storing data, as well as one or more smartphone applications ("apps") thereon. The memory circuit 62 may include flash memory, RAM or other memory hardware known in the art. A processor 64 may be in communication with the various components on the smartphone 22 for executing the functionality on the smartphone 22, including executing instructions that may be associated with any smartphone app stored on the memory circuit 62. The smartphone 22 may additionally include a short-range communications circuit 66 and a long-range communications circuit 68. The short-range communications circuit 66 may communicate via the short-range protocols mentioned above (Bluetooth™, WiFi™), while the long-range communications circuit 68 may communicate via the communications system 18, e.g., a cellular communications network. Although the mobile communication device in the exemplary embodiment includes the smartphone, it is understood that in other embodiments, the mobile communication device may include a tablet computer, smartwatch, or smart speaker, such as the Amazon™ Echo™.

As noted above, the sensitive diagnostic data may be uploaded to the remote diagnostic server 16 via the communication network 18, either with or without the use of the smartphone 22. As used herein, the term "remote diagnostic server" refers broadly to the data storage hardware, along with the processing hardware, and any software required to implement the functionalities of the remote diagnostic server 16 described herein. The remote diagnostic server 16 may include data storage units, processors, computers, transceivers, etc. The remote diagnostic server 16 may be capable of receiving the sensitive diagnostic data and analyze the sensitive diagnostic data to determine whether the sensitive diagnostic data is representative of any conditions that should be brought to the attention of the driver. In this regard, the remote diagnostic server 16 may include a plurality of preset vehicle conditions stored thereon, such that when the remote diagnostic server 16 receives the sensitive diagnostic data, the remote diagnostic server 16 analyzes the sensitive diagnostic data to determine whether the sensitive diagnostic data is representative of any of the preset vehicle conditions. The remote diagnostic server 16 may additionally include a set of rules to execute when it is determined that the sensitive diagnostic data is representative of one or more preset vehicle conditions. The preset vehicle conditions may be stored in a conditions table 48 on the remote diagnostic server 16, while the set of rules may be stored in a rules table 50 on the remote diagnostic server 16. The rules table 50 may include a plurality of rules matched with respective diagnostic conditions for specific vehicles.

The preset vehicle conditions may include problematic conditions and informational conditions. The problematic conditions may be associated with an underlying problem, whereas the informational conditions may not necessarily be indicative of an underlying problem, but may provide useful information to the user, such as a current fuel level or fuel range. An example of a problematic condition may be the existence of a DTC in the diagnostic data, the existence of which may cause the remote diagnostic server 16 to generate an alert signal to implement a specific function, e.g., alerting the user of the identified DTC. Examples of informational conditions may relate to conditions associated with routine maintenance of the vehicle, such as non-critical fuel, oil, tire pressure, windshield wiper fluid level, etc.

The preset vehicle conditions stored on the remote diagnostic server 16 may include an operable range for a particular vehicle condition. For instance, the vehicle condition may relate to a remaining oil life in the vehicle 12, and the corresponding stored operable range may include a predefined mileage of the vehicle 12 since a most recent oil change that would trigger an alert by the database (e.g., 1000 miles before a scheduled service). The vehicle operational condition may also relate to a level of gas in a gas tank on the vehicle 12, and the operable range may include a predefined level of gas under a maximum threshold, e.g., one-quarter tank of gas. The vehicle operational condition may also relate to brake shoe conditions, tire pressure, battery life, engine temperature, etc.

It is contemplated that the vehicle conditions stored in the remote diagnostic server 16 may include conditions that may not be immediately apparent from the diagnostic data received from the vehicle, but rather, may be identified based on a more sophisticated analysis of the diagnostic data. For instance, the remote diagnostic server 16 may also be capable of determining an urgency associated with repairing or otherwise addressing the identified diagnostic condition. For instance, the server 16 may categorize identified diagnostic conditions as being either a low urgency or a high urgency. If the diagnostic condition is associated with a high urgency, the remote server 16 may generate the alert signal for communication to the driver, a family member, repair shop, car dealership, etc. Conversely, if the diagnostic condition is associated with a low urgency, the remote server 16 may forego generating the alert signal. For more information regarding the determination of an urgency associated with the identified diagnostic condition, please refer to U.S. Pat. No. 9,761,062, entitled METHOD AND APPARATUS FOR INDICATING AN AUTOMOTIVE DIAGNOSTIC URGENCY, the contents of which are expressly incorporated herein by reference.

It is also contemplated that the vehicle conditions derived from the diagnostic data may be based on a diagnostic analysis aimed at identifying the underlying diagnostic condition in an efficient manner. In this regard, the diagnostic data received from the vehicle may include DTCs along with freeze frame data. The remote diagnostic server 16 may be capable of identifying a functional association between the freeze frame data and a single DTC. The single DTC associated with the freeze frame data may be treated as the highest priority DTC for purposes of identifying a vehicle condition. For more information regarding a diagnostic analysis based on a high priority DTC, please refer to U.S. Pat. No. 9,646,432, entitled HAND HELD DATA RETRIEVAL DEVICE WITH FIXED SOLUTION CAPABILITY, the contents of which are expressly incorporated herein by reference.

It is additionally contemplated that the vehicle conditions derived from the diagnostic data may include predicted conditions based on the current diagnostic data. The predicted conditions may be derived based on a comparison of the current diagnostic data with historical diagnostic data, which has been associated with a future diagnostic condition. For instance, the server may include a defect database for several different vehicles arranged by year, make, model, and/or engine. The defect database may include problems that have occurred on those vehicles, and the mileage at which those problems have manifested. The defect database may also associate the probability that issues may arise with particular components or systems on the vehicle within a given mileage range. For instance, for a given vehicle between 75,000 and 100,000 miles, there may be a high likelihood that the owner may need to replace the ignition coil, a medium probability or likelihood that the owner will need to replace the camshaft position sensor, and a low probability that the owner will need to replace the engine coil module. For more information regarding predictive diagnostics, please refer to U.S. Patent Application Publication No. 2016/0027223, entitled PREDICTIVE DIAGNOSTIC METHOD AND SYSTEM, the contents of which are expressly incorporated herein by reference.

The present system 10 may be configured such that certain predictive conditions identified by the server 16 may be equivalent to a vehicle condition which prompts generation of the alert signal by the diagnostic server 16. For instance, the system 10 may be set up such that any predictive condition that is highly likely to occur within the next 1000 miles, would prompt generation of the alert signal. Furthermore, the system 10 may be configured such that any predictive condition associated with certain, high importance system(s) may prompt the alert signal.

The preset vehicle conditions that may be desired by the user may be programmed into the conditions table 48 and the associated rules may be programmed into the rules table 50 at any time using a smartphone application ("app.") downloadable on a user's smartphone 22. The preset vehicle conditions and the associated rules may also be programmed through a website accessible via a computer. In this regard, the programming of the conditions may include selection of certain conditions from an available conditions list provided on the smartphone app or website. Some conditions may simply be associated with the existence of certain diagnostic data, such as a DTC or PID data, whereas other conditions may require further input, such as setting a magnitude or threshold level for the particular condition. For instance, the user may set the desired fuel level (e.g., ¼ tank, ⅓ tank, 100 mile range, etc.) at which an alert is sent to the user.

As noted above, when at least a portion of the diagnostic data is representative of at least one preset vehicle condition, the remote diagnostic server 16 may generate an alert signal, per the associated rule in the rules table 50, which may execute a desired function. In one embodiment, the associated rule may include providing voice alerts in a language understood by a user to convey diagnostic information associated with the received diagnostic data. For instance, if the diagnostic data reveals that the tire pressure is low, the rule may require the smartphone 22 to broadcast a signal such as, "Your tire pressure in your front driver's side tire is low. Please pull over as soon as possible to inflate." In addition to providing voice alerts in readily understandable language, the system 10 may be capable of receiving a verbal request from a user (e.g., the driver) and execute a diagnostic function in response to such verbal request, as will be described in more detail below.

The alert signal, as generated by the remote diagnostic server 16, may be in a digital format, and not in a voice format. Therefore, the alert signal may pass through the voice conversion tool 20 to convert the alert signal from the digital format to the voice format. The voice conversion tool 20 may be configured to receive digital signals and convert the digital signals into voice signals. Furthermore, the voice conversion tool 20 may also be capable of making the reverse conversion, i.e., converting voice signals into a digital signal, which may be played for a user. An example of a voice conversion tool is the hardware and software associated with Amazon™ Alexa™, or Apple™ Siri™.

The voice conversion tool 20 may be in communication with both the remote diagnostic server 16 and the smartphone 22 via the communication networks 18. It is also contemplated that in other embodiments, the voice-conversion tool 20 may be integrated into the remote diagnostic server 16.

The rules stored in the rules table 50 may not only result in signals being communicated to the driver's smartphone 22, the rules may also result in signals being communicated to other individuals or destinations. For instance, communications may be sent to family members (e.g., parents) of the driver, or to a place of business (e.g., a repair shop) based on the trigger condition represented by the diagnostic data. In this regard, the trigger condition, the diagnostic data, and or a possible diagnostic solution associated with the trigger condition may be transmitted to a preprogrammed electronic address, which may provide e-commerce functionality, e.g., to identify, indicate the price, and facilitate the sales activities associated with the possible diagnostic solution. For more details regarding e-commerce functionality, please refer to U.S. Pat. No. 9,824,507, entitled MOBILE DEVICE BASED VEHICLE DIAGNOSTIC SYSTEM, the contents of which are expressly incorporated herein by reference.

With the basic architecture of the system 10 described above, the following discussion provides an exemplary overview of use of one aspect of the system 10. A driver drives the vehicle 12 having the diagnostic dongle 14 plugged into the diagnostic port 30 on the vehicle 12. As the vehicle 12 moves, the speed information (i.e., non-disruptive diagnostic data) may be communicated from the ECU 26 to the diagnostic dongle 14. When the speed is above zero, the dongle 14 may determine that the vehicle 12 is in motion, and thus, the dongle 14 does not request any additional diagnostic data from the vehicle 12. However, when the speed is equal to zero, the dongle 14 can determine that the vehicle 12 has stopped, which causes the dongle 14 to generate the request for the sensitive diagnostic data, which is then uploaded to the remote diagnostic server 16, either through the long range communication capabilities of the dongle 14, or via the driver's smartphone 22. It is contemplated that the non-disruptive diagnostic data may also be uploaded to the remote diagnostic server 16 along with the sensitive diagnostic data.

Once the remote diagnostic server 16 receives the diagnostic data, the remote diagnostic server 16 analyzes the diagnostic data to determine whether the diagnostic data is representative of any of the preset vehicle conditions stored on the conditions table 48. This determination may include a comparison of the diagnostic data with the preset vehicle conditions in the conditions table 48, and when there is a match, or if the data falls within a defined range, the trigger condition(s) is met, and the remote diagnostic server 16 references the rules table 50 to determine the rule associated with the triggered condition. The database 16 then generates the alert signal to execute the determined rule. If the diagnostic data is not representative of any preset vehicle conditions, the comprehensive data may be stored for possible recall or use in the future. For instance, the diagnostic data may be compiled to identify diagnostic trends or possible predictive diagnostics of the vehicle 12.

In many instances, the rule associated with the triggering condition will require that the driver is alerted of the triggering condition. In this regard, the remote diagnostic server 16 may generate an alert signal in a digital format, and thus, the alert signal may be uploaded to the voice conversion tool 20 for reformatting into a voice format. Once in the voice format, the alert signal may be communicated to the smartphone 22 or voice assistant 24 for broadcast to the user. Should the dongle 14 have a speaker, as well as the capability of receiving a signal in a voice format, the alert signal may be communicated to the dongle 14 for broadcast by the dongle 14 to the user.

The smartphone 22 (or dongle 14 or voice assistant 24) may be configured to only make the broadcast when the vehicle 12 is not moving, so as not to distract the driver. In this regard, the smartphone 22 or the dongle 14 may be used to determine whether the vehicle 12 is moving, as will be described in more detail below. Once the determination is made that the vehicle 12 is not moving, the broadcast may begin. However, in some instance, it may be urgent to alert the driver of a particular condition. In those instances, the broadcast may be executed immediately upon receipt of the alert signal by the smartphone (or dongle 14). In this regard, certain trigger conditions may be associated with an urgency indicator, meaning that the execution of the corresponding functionality should proceed independent of an analysis of the vehicle's motion.

The system 10 and related method described above may be embodied as a proactive diagnosis or alert system, which may operate independent of any manual or verbal input or request by a user. In this regard, the system 10 may be configured to autonomously initiate the associated methodology whenever the vehicle stops. Thus, conditions that may arise while the vehicle 12 is driven may be identified by the system 10 and communicated to the driver before the driver may notice any symptoms associated with the condition. As such, the system 10 may help the driver maintain the vehicle 12 and avoid possible breakdowns in the future.

Although the system 10 may retrieve and analyze data without input by the user, it is also contemplated that the system 10 may include the capabilities of receiving a verbal request by a user and executing that verbal request. The user may be the driver, or an individual remote from the vehicle 12 of interest. Accordingly, the communication capability of the smartphones 22 and voice assistant(s) 24, along with the voice translation capability of the voice conversion tool 20, allows individuals to make verbal requests for vehicle data or information, for both a local vehicle 12 (i.e., a vehicle 12 in which the user is located) as well as a remote vehicle 12.

The voice assistant(s) 24 or the smartphone(s) 22 having a virtual assistant application stored thereon may collectively be referred to as a virtual assistant device. Each virtual assistant device 22, 24 may include a microphone to allow the virtual assistant device 22, 24 to receive verbal requests or commands. The verbal request received by the virtual assistant, may be translated into wireless request signal for transmission to a remote location. In more detail, each virtual assistant device 22, 24 may have the ability to upload or communicate the wireless request signal to the voice conversion tool 20, via the communication system 18, e.g., the Internet cloud. In the case of a voice assistant 24, a local WiFi™ may be used to relay the wireless request signal to the communication system 18, while the smartphone 22 may be capable of independently uploading the wireless request signal to the communication system 18, although other communication networks, such as WiFi™ may also be used if such networks are within range of the smartphone 22.

An example of verbal request that may be made by a user may be "perform quick scan." The local virtual assistant, e.g., the smartphone 22 or voice assistant 24, may detect such verbal request and translate the verbal request into the wireless request signal, which is then uploaded to the voice conversion tool 20. The voice conversion tool 20 may be capable of converting the wireless request signal into an executable command signal for the dongle 14 to execute. Thus, the executable command signal is communicated from the voice conversion tool 20 to the dongle 14 via the communication system 18 and associated smartphone 22.

After the dongle 14 receives the executable command signal, the dongle 14 may perform the quick scan (or other diagnostic function) by transmitting a request to the vehicle ECU 26. If the request is of the nature that may be accommodated whether the vehicle 12 is stationary or in motion, then the system may not make a determination as to the operational status prior to accommodating the request. However, if the request is of the nature that should only be performed while the vehicle 12 is not moving, then the system 10 may determine the operational status of the vehicle 12, as described in more detail above.

Once the dongle 14 performs the scan, the results of the scan may be uploaded to the remote diagnostic server 16 for analysis to produce a diagnostic result, which may be a possible diagnostic solution, or an all-clear indication. The diagnostic result may be communicated from the remote diagnostic server 16 to the voice conversion tool 20 to translate the diagnostic result into a signal which can be played back to the user via the speaker on the virtual assistant 22, 24 in terms that may be understandable to the user. For instance, if the quick scan reveals a DTC generated by the vehicle's trunk module, the audible playback by the virtual assistant may be "Looks like your trunk is overloaded with groceries or shopping bags," rather than "your trunk module has a DTC."

The ability to receive verbal requests or commands for data retrieval or function control on a remote vehicle 12 may provide several benefits. For instance, in families having two or more drivers in the family, the virtual assistant 22, 24 may allow a parent to request information from a vehicle 12 operated by a teenage driver. The parent may be able to retrieve varying levels of information from the vehicle 12, including basic information, such as speed and location information, as well as diagnostic information, such as any possible DTCs or other possible diagnostic issues with the vehicle 12. Furthermore, the system may allow a user to remotely control features on a vehicle 12, such as remotely starting the vehicle 12, and turning on the heater or air-conditioner.

The system 10 may also be configured to direct possible diagnostic issues to an assigned individual. For instance, when DTCs are generated on a vehicle 12 operated by a teenage driver, a parent may automatically receive a notification in the form of a text message, an email, or a voice alert. The type of notification and the desired electronic address (e.g., email address, smartphone number, etc.) may be programmed during initial setup.

The voice communication capability allows information to be audibly communicated to the driver of a vehicle 12 via the driver's smartphone 22 in a language understood by the user. As such, the user's eyes may remain on the road, rather than having to look at the smartphone 22 to read the message or alert. Furthermore, the autonomous capabilities of the system may allow a scan to be performed, the data diagnosed, a possible solution identified, which is then translated via the voice conversion tool 20, which is then communicated to the user, all without any user input. Thus, as the user may be driving down the road, the smartphone 22 may provide a status alert, such as, "tire pressure in the rear passenger side is low." The system may also be used to provide alerts to the user regarding the gas levels based on a preprogrammed destination. For instance, if the preprogrammed destination is approximately 200 miles away, but the estimated fuel range is only 175 miles, the system may alert the driver, "gas will likely be needed to reach the intended destination." The smartphone application may be able to conduct a search of nearby gas stations to alert the user of the closest gas station, or the gas station having gas at the lowest price.

As another example, a user may ask, "What is my fuel level now," or "Can I make it to my destination," and the system, through the communication capabilities of the dongle 14, the smartphone 22, and voice conversion tool 20 may be able to provide an answer in understandable terms, such as, "Your fuel tank is three-quarters full," or "Your fuel range is 250 miles," or "Yes, you have enough fuel to reach your destination." The virtual voice assistant may also provide diagnostic information to the user attributable to normal wear and tear on the vehicle 12. For instance, the virtual voice assistant may notify the user that the "Oil life is low," or that the "Brake shoe life is low," or "Service needed in 1000 miles. As such, the virtual voice communication capabilities, at least in part attributable through the voice conversion tool 20, allow for diagnostic results to be communicated to a user in audible, simple to understand terms. Furthermore, a user may make verbal requests, which are then translated into executable diagnostic commands by the voice conversion tool 20, for implementation via the diagnostic hardware, such as a dongle 14.

In some instance, the user may believe there is a problem with the vehicle 12, and thus, the user may request a diagnostic scan to determine the source of the problem. However, an analysis of the diagnostic data resulting from the scan may not reveal a problem. Therefore, in one embodiment of the system 10, the driver may be asked a series of questions to try and identify a diagnostic solution based on symptoms that may be provided by the user. For instance, the driver may be asked the following questions: "Do you smell something abnormal? Do you see something abnormal? Do you hear something abnormal? Do you feel something abnormal?" The driver's answers to each question may prompt follow up questions, until a possible diagnostic condition may be determined. For more information regarding prediction diagnostics, please refer to U.S. Pat. No. 9,142,066 entitled MULTI-STAGE DIAGNOSTIC SYSTEM AND METHOD, the contents of which are expressly incorporated herein by reference.

Figure 7:
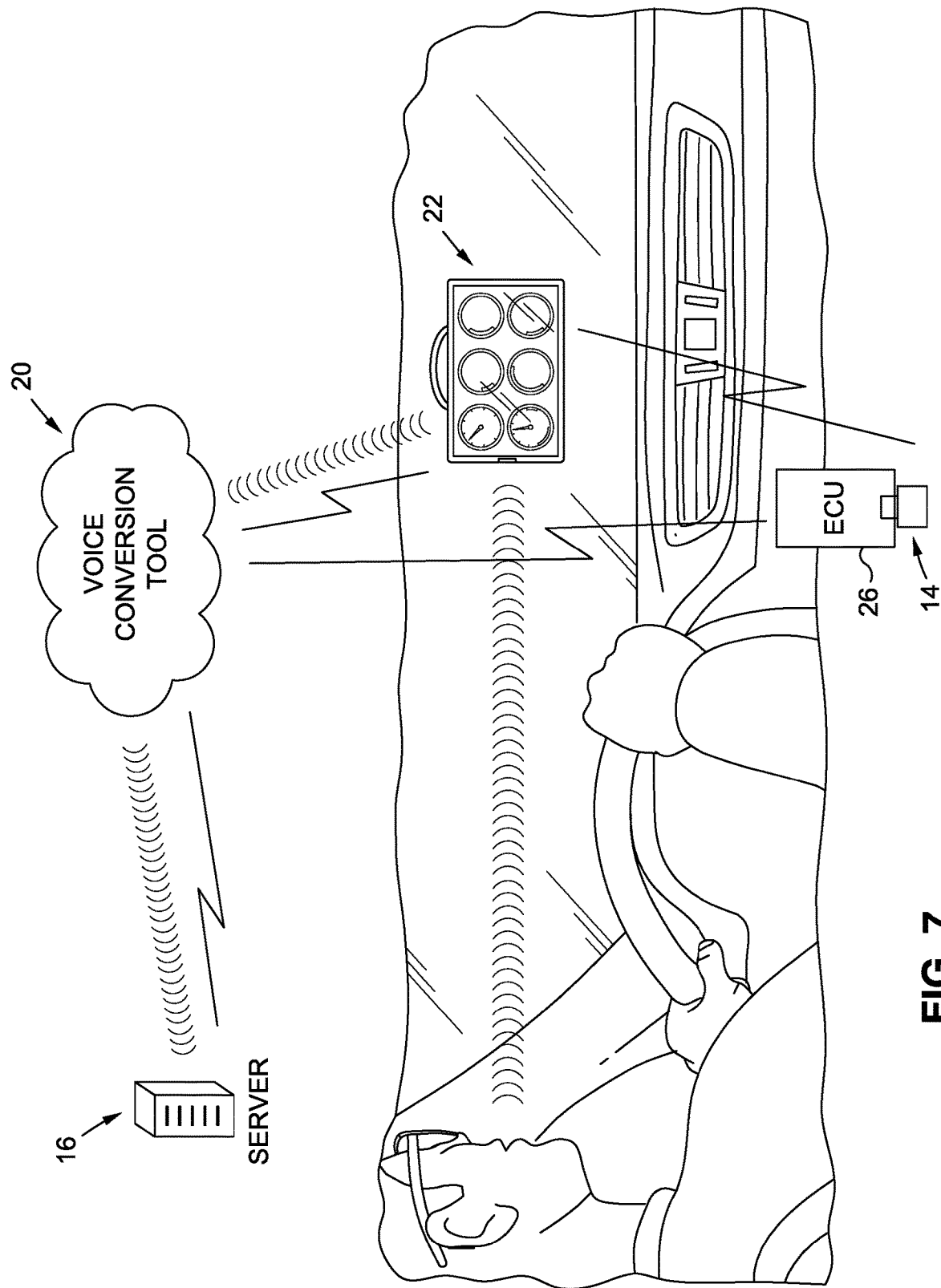
FIG. 7 is a schematic view of a system allowing hands free retrieval, display and broadcast of diagnostic data.
Figure 8:
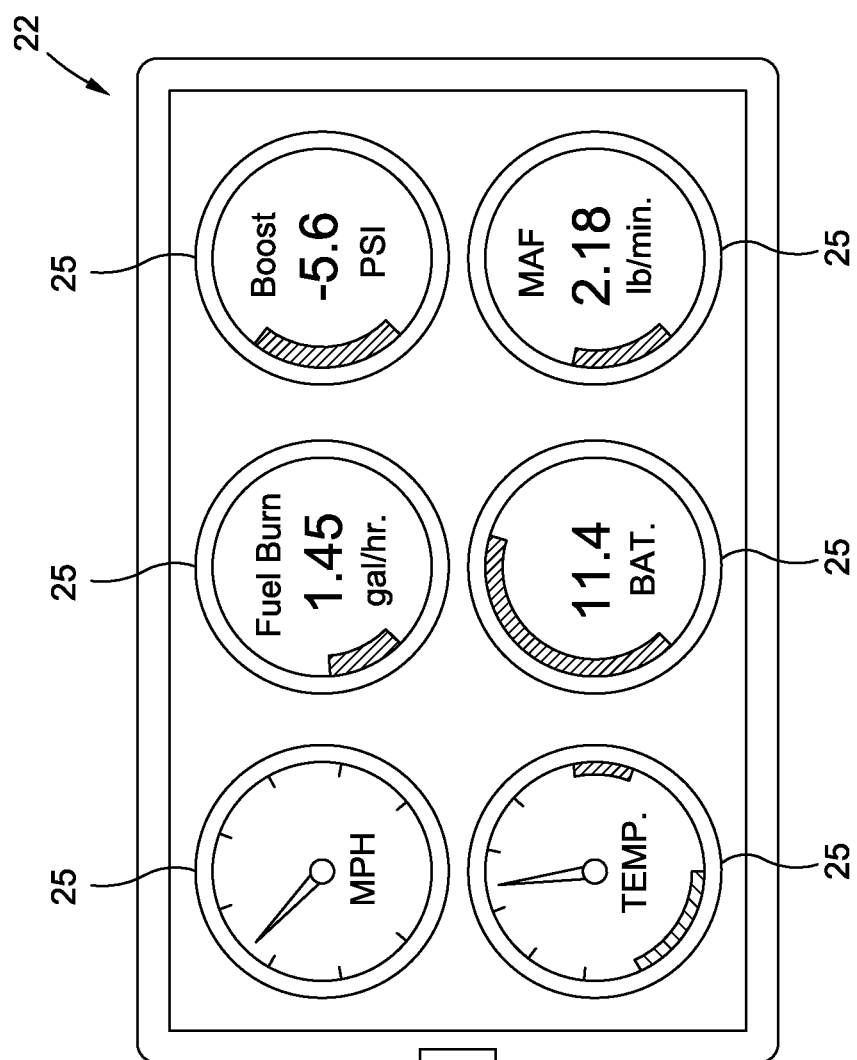
FIG. 8 is an enlarged view of a smartphone, as included in the system depicted in FIG. 7, displaying vehicle diagnostic data.

Referring now to FIGS. 7 and 8, various aspects of the system 10 may allow diagnostic data to be displayed on the smartphone 22 for review by the driver, and then allow the driver to submit queries or questions based on the displayed data. FIG. 7 shows the smartphone 22 connected to the windshield via a holder attached to the windshield via suction or adhesive. The smartphone 22 displays six gauges 25 of different diagnostic data. FIG. 8 is an enlargement of the smartphone display, with the six gauges 25 representing speed (mph), engine temperature, fuel burn, battery level, boost, and mass air flow (MAF) readings. The data on the smartphone may be displayed via continuous diagnostic monitoring via the dongle 18, or via the methodologies described herein, e.g., the data may be the result of prompting by the vehicle 12 or by the user. In any event, the data may be displayed on the smartphone 22 for review by the driver. After reviewing the data, the driver may want to request additional data or ask follow up questions to better understand the data, or to obtain related data. For instance, the displayed MAF reading may prompt the driver to ask for a historical chart of recent mass air flow readings to allow the driver to detect a possible trend as to MAF data. As such, the driver may make a verbal request for additional data, wherein the verbal request is received by the smartphone 22, uploaded to the voice conversion tool 20, then transmitted to the dongle 14 to retrieve the data from the ECU 26. Alternatively, the request may be transmitted to the remote server 16 if the requested data or information is available on the remote server 16 (e.g., historical data, vehicle identification information, etc.). Ultimately, the requested data may be retrieved and possibly analyzed by the dongle 18, remote server 16 or the smartphone 22, and then information may be broadcast audibly or displayed visually on the smartphone 22. As such, the system 10 may provide hands-free data retrieval and display that allows the user to maintain focus on the road when driving, while also providing real-time diagnostic data and analysis to the driver. Other previously existing systems, such as a system made available under the name, BlueDriver™, may allow diagnostic data to be displayed on a smartphone located in the vehicle. However, such previously existing systems are limited in their ability to allow for verbal requests and follow up inquiries by the driver. Furthermore, such existing systems may also be limited in their ability to convey information audibly in regularly understood verbiage. As such, the functionalities of the system 10 described herein provides a powerful advancement over such previously existing, non-verbal systems.

The ability to provide information regarding the operation or diagnostic status of a given vehicle 12 may depend on the ability to access information from the vehicle 12. Various embodiments described above, note that data or information from the vehicle 12 may only be requested when the vehicle 12 is not moving. Accordingly, the following discussion provides a more comprehensive overview of how a determination that the vehicle 12 is not moving may be made, and how certain data may be retrieved from the vehicle 12 in a safe manner so as to avoid disruption of vehicle operation.

Referring again specifically to FIG. 2, the vehicle 12 may include one or more onboard engine control unit(s) (ECU) 26 and a plurality of electrical systems 52 in operative communication with the ECU 26. Each electrical system 52 may include one or more control modules and sensors 54. The electrical systems 52 may implement various operational functions on the vehicle 12. For instance, the electrical systems 52 may include ignition and fuel systems, which monitor engine misfires, catalytic converter operation, evaporative emissions controls systems, and other emission control systems, such as exhaust gas recirculation (EGR) and positive crankcase ventilation (PCV). The electrical systems 52 may additionally relate to the powertrain, braking, steering, suspension, climate control, lighting, entertainment, communications and navigation of the vehicle 12. As such, the electrical systems 52 may include one or more of the following control modules: anti-lock braking system (ABS)/traction control/stability control module, airbag (SRS) module, alarm module for anti-theft system, cruise control module, electronic steering module, fuel pump control module, keyless entry module, lighting module, remote start/immobilizer module, suspension control module, wiper motor control module, vehicle communication module, and trunk control module.

If a component or system 52 on the vehicle 12 is not operating within acceptable limits or fails a self-test, one or more diagnostic trouble codes (DTCs) may be generated and stored on the ECU 26. The DTCs may include four main categories of codes: Powertrain ("P") codes, Body ("B") codes, Chassis ("C") codes, and Network Communications ("U") codes. The P codes relate to engine, transmission, and emission systems, the B codes relate to climate control systems, lighting systems, and airbags, the C codes relate to anti-lock braking systems, electronic suspension systems, and steering systems, and U codes relate to controller area network wiring bus and modules.

The status determining circuit 36 on the dongle 14 may be used for determining the operational status of the vehicle 12, and the communications control circuit 38 may be used for controlling certain communications between the dongle 14 and the vehicle 12. The dongle 14 may additionally include a central processing unit (CPU) 56 to control operations of the dongle 14. The memory circuit 40 on the dongle 14 may be capable of storing data that may be received by the dongle 14 or generated by the dongle 14. The memory circuit 40 may include flash memory, random-access memory (RAM), or other memory hardware known in the art. The GPS circuit 42 may be located on the dongle 14 to detect position information of the dongle 14. Furthermore, the dongle 14 may include the accelerometer 44 for detecting changes in acceleration of the dongle 14. The LED(s) 46 may be included on the dongle 14 to provide a visual alert to the user. The visual alert may be associated with a data connection being established or terminated between the dongle 14 and the vehicle 12. It is also contemplated that the visual alert may provide the user with a quick visual indication as to the diagnostic status of the vehicle 12 after a scan is completed. For instance, if the LED 46 is illuminated so as to be red, a severe or urgent diagnostic condition may have been detected, if the LED 46 is illuminated so as to be orange, a mild or less urgent diagnostic condition may have been detected, and if the LED 46 is illuminated so as to be green, no diagnostic condition may have been detected.

The smartphone 22 may also include a GPS circuit 70 to determine the location of the smartphone 22, as well as an accelerometer 72 to detect changes in acceleration of the smartphone 22. The hardware on the smartphone 22, such as a GPS circuit and an accelerometer, may also be included in the voice assistant 24.

The smartphone 22 may additionally include a status determining circuit 74 for determining the operational status of the vehicle 12, and a communications control circuit 76 for controlling certain communications between the dongle 14 and the vehicle 12, as will be described in more detail below.

In general, the dongle 14 may be used to perform a diagnostic scan of one or more systems 52 on the vehicle 12, with the smartphone 22 providing the ability to upload data to the remote diagnostic server 16 and display a possible diagnostic solution to a user via the display 58 on the smartphone 22. A unique aspect of the present system is the ability to identify one or more sensitive systems 52 on the vehicle 12 and limit diagnostic scanning of such systems 52 to only when the vehicle 12 is not moving. A sensitive system 52 is a vehicle system that produces sensitive data. Thus, in order to limit scanning of such systems 52 to when the vehicle 12 is not moving, the diagnostic system may capable of detecting an operational status of the vehicle 12 as being one of a moving status and a non-moving status. This may be done in a variety of different ways, using different equipment, including the dongle 14 and/or the smartphone 22, including the respective status determination circuits 36, 74. In general, status data generated by one or more of a host of different sources may be used to determine the operational status of the vehicle 12.

In one embodiment, the status of the vehicle 12 may be determined by analyzing status data generated by the vehicle 12. For instance, the status data may include RPM data retrievable from the ECU 26 and analyzed by the status determination circuit 36 on the diagnostic dongle 14 or the status determination circuit 74 on the smartphone 22 to determine the operational status of the vehicle 12. RPM data associated with an RPM at or above a predetermined threshold may indicate that the vehicle 12 is moving, while RPM data associated with an RPM below the predetermined threshold may indicate that the vehicle 12 is not moving.

The vehicle 12 may produce additional data that may be used as status data, such as speed data as well as axle rotation data. In those instances, such data having any magnitude above zero may be indicative of the vehicle 12 being associated with a moving status, and the non-moving status being associated with a zero magnitude. Transmission data may also be helpful in determining the operational status of the vehicle 12. For instance, when the transmission is in park, the vehicle status may be conclusively determined as being the non-moving status. However, when the transmission is in some other mode, e.g., drive, neutral, or reverse, a conclusion as to operational status may not be determined solely on the transmission mode and some additional data may be required. Certain electrical signals generated by the vehicle 12 may also be useful in determining whether the vehicle 12 is associated with a moving status or a non-moving status. For instance, the magnitude of power drawn from the battery may be greater when the vehicle 12 is moving relative to when the vehicle 12 is not moving. Furthermore, the vehicle 12 may include onboard navigational equipment, such as a GPS, which may be used to detect movement of the vehicle 12. In other words, the vehicle 12 may include a wide range of sensors or status data sources which may provide status data to the diagnostic dongle 14 or the smartphone 22 for determining the operational status of the vehicle 12.

The status data may also be produced by the smartphone 22. In this regard, the smartphone 22 may be capable of detecting its entry into the vehicle 12, after which the status determination circuit 74 may be used to detect operational status of the vehicle 12. In this regard, pairing of the smartphone 22 with the vehicle's local wireless communication system (e.g., Bluetooth™) may allow the smartphone 22 to conclude that it is in the vehicle 12. Furthermore, plugging the smartphone 22 into a charging cable in the vehicle 12 may also allow the smartphone 22 to conclude that it is in the vehicle 12. Additionally, the microphone 60 and accelerometer 72 on the smartphone 22 may allow the smartphone 22 to detect sounds associated with entering a vehicle 12, such as opening and closing a door, as well as detecting motions associated with entering a vehicle 12, such as the user entering the vehicle 12 and sitting in the seat.

When the smartphone 22 detects its position as being in the vehicle 12, the smartphone 22 may generate status data for determining the operational status of the vehicle 12 using the status determination circuit 74. For instance, data generated by the GPS circuit 56 or accelerometer 72 on the smartphone 22 may be used to determine movement or changes in acceleration, respectively, which may be indicative of the vehicle 12 moving, and thus, being associated with a moving status. A detection of no movement or no change in acceleration over a period of time may be indicative of the vehicle 12 being associated with the non-moving status. The microphone 60 on the smartphone 22 may also be used to detect the operational status of the vehicle 12. In particular, the microphone 60 may be capable of detecting and differentiating between vibrations associated with the vehicle 12 idling and vibrations associated with vehicle 12 being in motion. For more information regarding the use of the smartphone 22 for detecting an operational status of the vehicle 12, please refer to U.S. Pat. No. 9,646,427, entitled SYSTEM FOR DETECTING THE OPERATIONAL STATUS OF A VEHICLE USING A HANDHELD COMMUNICATION DEVICE, the contents of which are expressly incorporated herein by reference.

The status data may also be produced by the diagnostic dongle 14. For instance, the GPS circuit 42 or accelerometer 44 on the dongle 14 may be used by the status determination circuit 36 to determine movement or changes in acceleration, respectively, which may be indicative of the vehicle 12 moving, and thus, being associated with a moving status. A detection of no movement or no change in acceleration over a period of time may be indicative of the vehicle 12 being associated with the non-moving status.

Figure 5:
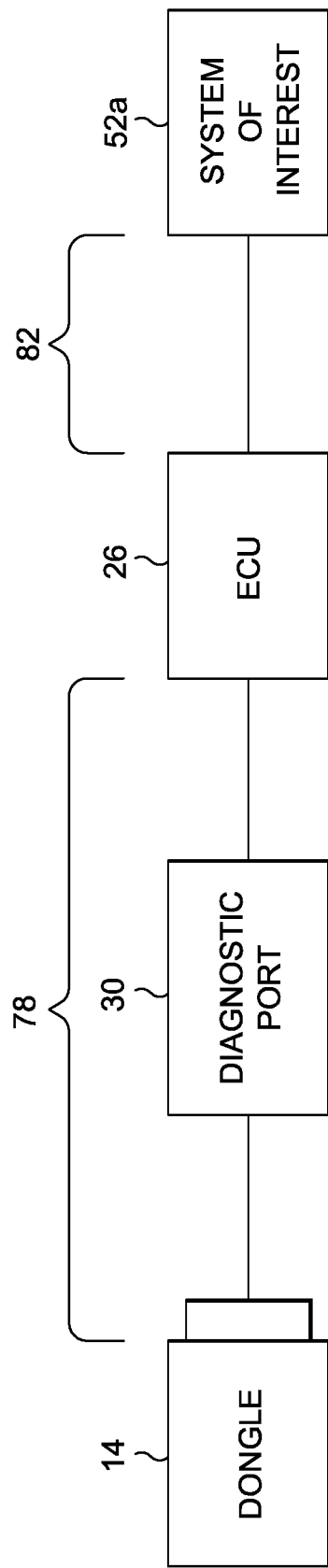
FIG. 5 is a schematic view depicting an initial data link and a system data link.
Figure 6:
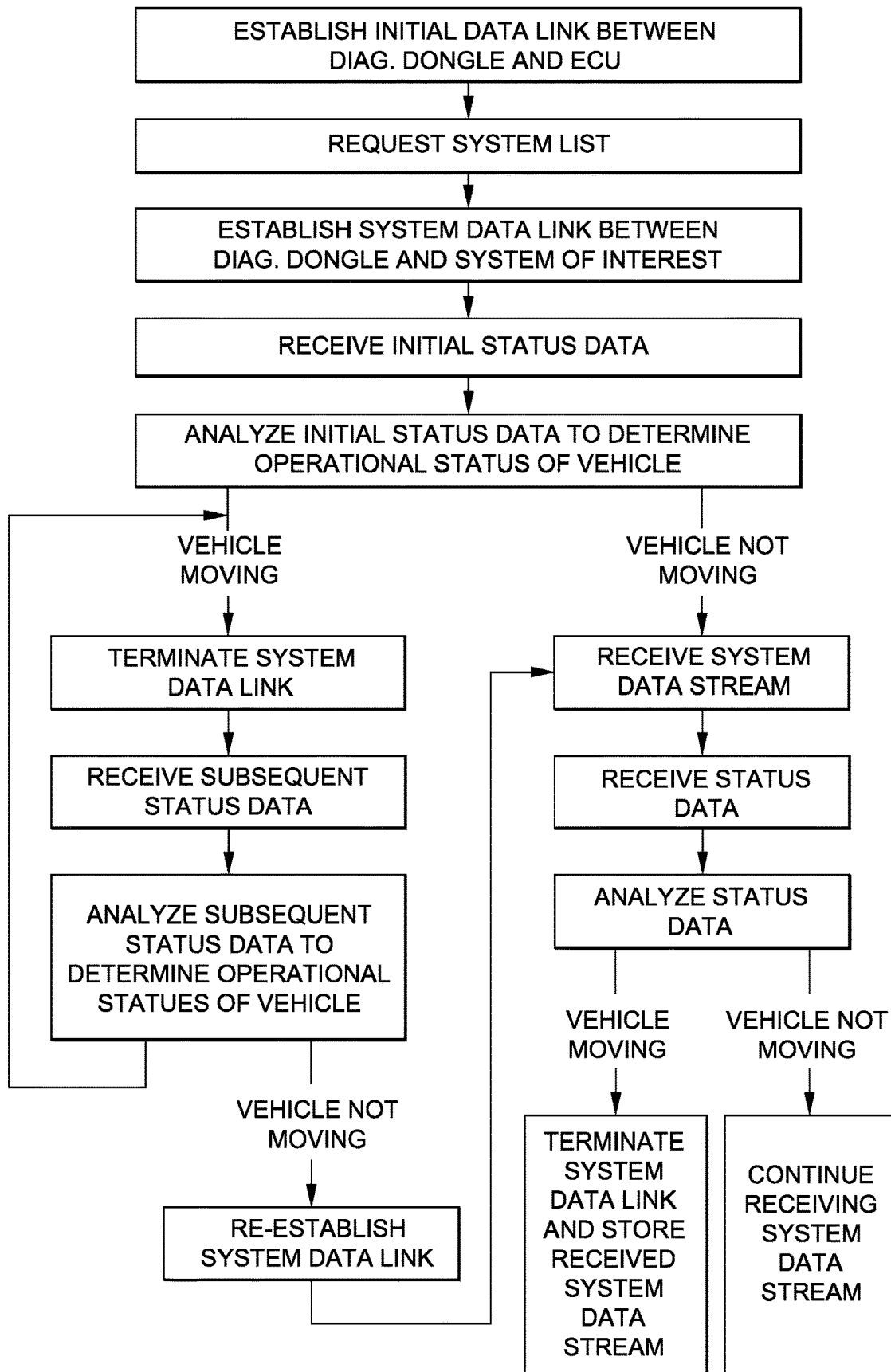
FIG. 6 is a flow chart illustrating an exemplary method of performing a vehicle scan.

The diagnostic dongle 14 may be plugged into the diagnostic port 30 on the vehicle 12 and an initial data link 78 (see FIG. 5) may be established between the diagnostic dongle 14 and the ECU 26 via the diagnostic port 30. This initial data link 78 may allow for basic communication between the dongle 14 and the ECU 26, wherein the dongle 14 may poll the ECU 26 to determine one or more communication protocols, as well as to retrieve vehicle information from the ECU 26, such as an electronic vehicle identification number (VIN), and the year, make, model, and engine of the vehicle 12. The initial data link 78 may also be used to communication status data to the dongle 14 from the ECU 26.

After the initial data link 78 is established, the dongle 14 may transmit a request via the initial data link 78 for a systems list 80 identifying the plurality of vehicle systems 52 from the ECU 26. The systems list 80 may be used to identify a system of interest 52a (see FIG. 5) based on a predetermined ranking of the plurality of vehicle systems 52. Along these lines, various systems 52 or control modules may have vastly different types of data. As such, the ordering or frequency of scanning the various system 52 or control modules may be done in a manner aimed at reducing the overall scanning time. Accordingly, an algorithm may be stored on the dongle 14 or included in a smartphone app downloadable onto the smartphone 22 for prioritizing the ordering and frequency of performing scans of the various systems 52 or control modules.

Once a system of interest 52a has been identified, a system data link 82 may be established between the diagnostic dongle 14 and the system of interest 52a. As shown in FIG. 2, the system data link 82 may form only a portion of the communication path between the dongle 14 and the system of interest 52a, with the system data link 82 specifically forming that portion of the communication path between the ECU 26 and the system of interest 52a, while the initial data link 78 provides the communication path between the dongle 14 and the ECU 26. In this regard, the initial data link 78 and system data link 82 are shown to have a serial relationship to each other. However, it is understood, that in other embodiments, the system data link 82 may extend completely between the system of interest 52a and the dongle 14 completely separate from the initial data link 78.

Initial status data may be received by one of the status determination circuits 30, 60 on the diagnostic dongle 14 or the smartphone 22, and analyzed to determine whether the operational status of the vehicle 12 is the moving status or the non-moving status. As described in more detail above, the initial status data may be provided from any number of different sources. It is contemplated that in some embodiments, the determination of the operational status of the vehicle 12 may be performed prior to establishment of the system data link 82, such that the system data link 82 may only be established if the operational status is a non-moving status. In this regard, the initial status data may be received prior to establishing the system data link 82. However, initial status data may continue to be received after establishment of the system data link 82.

The system data link 82 may be terminated when the operational status is determined to be the moving status. The termination of the system data link 82 may include an active command by the dongle 14 to instruct the ECU 26 to delete or disable any established system data link 82 previously requested by the dongle 14. Furthermore, the termination may include the deactivation of certain pins or communication modules on the dongle 14 associated with the system data link 82. Ultimately, the termination of the system data link 82 is to ensure that the vehicle 12 does not expend resources transmitting data from a sensitive system 52 when the vehicle 12 is in motion. Rather, the resources of the vehicle 12 may instead be directed toward the safe operation of the vehicle 12. As such, when the system data link 82 is terminated, the dongle 14 may be effectively decoupled from the system of interest 52a.

When the system data link 82 is terminated, the system may continue to receive subsequent status data to identify when the vehicle 12 transitions from the moving status to the non-moving status. In this regard, the term subsequent status data refers to status data received after termination of the system data link 82, whereas initial status data refers to status data received prior to termination of the system data link 82. It is contemplated that initial status data and subsequent status data may be requested according to a preset schedule, e.g., every 10 seconds.

When the subsequent status data is generated by the dongle 14 or the smartphone 22, all communications between the dongle 14 and the ECU 26 may be terminated when the vehicle 12 is moving. In other words, there may be no need to maintain a data link with the vehicle 12 if the status data is being generated by resources separate from the vehicle 12. However, if the status data is supplied from the vehicle 12, a data link separate from the system data link 82, such as the initial data link 78, may remain in place to allow the dongle 14 to receive the status data from the vehicle 12. In this regard, the data link which may provide status data from the vehicle 12 may not interfere with normal operation of the vehicle 12, even if such data link remains in place during operation of the vehicle 12.

When the subsequent status data reveals that the vehicle 12 has transitioned from the moving status to the non-moving status, the system data link 82 may be re-established to allow for further scanning operations. At least one of the communication control circuits 38, 76 on the dongle 14 and smartphone 22, respectively may control the initial establishment, termination, and re-establishment of the initial data link 78 and the system data link 82 based on the determined operational status of the vehicle 12.

During a scan of the system of interest 52a, a system data stream may be received by the dongle 14 from the system of interest 52a via the system data link 82 while the system data link 82 is intact or in use. The system data stream may ultimately be uploaded to the remote diagnostic server 16 for diagnostic analysis. However, if the system data link 82 is terminated during transmission of the system data stream from the system of interest 52a to the dongle 14, steps may be taken to facilitate the resuming of the download of the system data stream once the vehicle 12 stops moving. Along these lines, at least a portion of the system data stream may be temporarily stored or buffered in at least one of the memory circuits 40, 62 of the dongle 14 or smartphone 22 as the data stream flows to the remote diagnostic server 16. In the event the system data link 82 is terminated, the buffered data in the memory circuit(s) 40, 62 may be used to identify where the scan should resume when the vehicle 12 stops moving. A digital marker may be created by the processor 56, 64 in the dongle 14 or smartphone 22 in response to detection of the vehicle 12 moving, with the digital marker being representative of that portion of the system data stream already received via the system data link prior to termination of the system data link. A resume command may be generated by one of the processors 56, 64 based on the digital marker to resume the step of receiving the system data stream to receive a remaining portion of the system data stream yet to be received.

If the data stream download is disrupted, the processor 56 on the dongle 14 may generate an alert which is communicated and displayed on the user's smartphone 22 to make the user aware that the scan is incomplete and will require additional time once the vehicle 12 is stopped. Furthermore, a separate notification may be sent once the scan is complete to notify the user.

Once the scan is complete, data is uploaded to the remote diagnostic server 16, a possible diagnostic solution may be identified based on an analysis of the data. The database may transmit a signal back to the smartphone 22, which allows the user to view the possible diagnostic solution on the smartphone 22. The possible diagnostic solution may be verified by requesting live data from the ECU 26. The signal for requesting the live data may be generated by the remote diagnostic server 16, the processor 64 on the smartphone 22 or the processor 56 on the diagnostic dongle 14. For more information regarding the use of vehicle data for automotive diagnostics in a telematics system, please refer to U.S. Pat. No. 9,824,507, entitled MOBILE DEVICE BASED VEHICLE DIAGNOSTIC SYSTEM, the contents of which are expressly incorporated herein by reference.

It is contemplated that several steps of the diagnostic method may proceed independent of user intervention. In other words, at least one step, and in some instances, most steps, may proceed autonomously. For instance, the steps of establishing the initial data link, transmitting a request from dongle 14 to the ECU 26 via the initial data link 78, establishing a systems data link 82, receiving initial status data, analyzing the initial status data, terminating the systems data link 82, receiving subsequent status data, analyzing the subsequent status data, and re-establishing the system data link 82 may proceed independent of user intervention. Rather, the method may be triggered by the receipt of a power signal from the vehicle, or a signal indicating that the vehicle has been turned on, e.g., an ignition signal. It is also contemplated that the method may be triggered when the smartphone 22 or the dongle 14 becomes wirelessly synched with the vehicle's local wireless communication network (e.g., BLUETOOTH™). In this regard, the smartphone 22 and or the dongle 14 may be programmed to autonomously execute one or more steps of the methodology described herein based on a number of different triggering events. As noted above, it is contemplated that the user may make a verbal request for diagnostic information, and thus, one aspect of the method may allow for autonomous execution of the steps following receipt of the verbal request. For instance, the steps of transmitting the verbal request to the voice conversion tool 20, converting the request from a voice format to a digital format, retrieving any diagnostic data from the vehicle using the dongle 14, uploading the diagnostic data to the remote server 16, performing a diagnostic analysis of the data to determine a possible diagnostic solution, transmitting the possible diagnostic solution to the voice conversion tool 20 to place the possible diagnostic solution in a voice format, and broadcasting the possible diagnostic solution to the user may all proceed autonomously.

The system and method described above allows a do-it-yourself user to access diagnostic information that may otherwise only be available by taking the vehicle 12 to a dealership or specialized repair shop. In this regard, the ability to identify the systems 52 on a vehicle 12 and conduct a targeted scan of the vehicle 12, or alternatively, a full, comprehensive scan, while ensuring that any sensitive system 52 is scanned only when the vehicle 12 is not moving, may allow the do-it-yourself user to access diagnostic data that would otherwise be unavailable using conventional scan tools. Accessing sensitive systems 52 on the vehicle 12 only when the vehicle 12 is not moving allows the user to retrieve such data while the vehicle 12 may be idling, such as at the beginning or end of a trip, or while waiting at a stop light. Thus, the user may not be required to devote separate time to conduct the scan of the vehicle 12. Moreover, the use of the driver's smartphone 22 may allow notifications or communications to be made to the driver in a timely fashion, and in some instance, while the driver is in the vehicle 12.

The initiation of the scan may be triggered by any one of several different actions. In one instance, the scan may be triggered by the user through the smartphone app, either through manual gestures on the smartphone touchscreen display 58, or through a verbal command, e.g., "perform scan." In another instance, the scan may be triggered according to a preset schedule, e.g., scan once a week. The scan may also be triggered based on signals generated by the vehicle 12. For instance, if the check engine light illuminates, the dongle 14 may be capable of detecting a signal associated therewith, which may initiate a scan. In this regard, a user may program the system to initiate the scan based on any number of triggering conditions.

The use of the smartphone 22 may allow the smartphone 22 to function as a virtual voice assistant, which may receive verbal diagnostic commands from the user, as well as convey possible diagnostic solutions to the user in readily understandable terms. The virtual voice assistant may also be capable of linking the user to remote electronic devices and resources.

Although the foregoing describes an operative relationship between a vehicle ECU and a diagnostic dongle for accessing data and information from the vehicle, it is contemplated that in various alternative embodiments, the vehicle ECU may be configured to output data and information without the need for a diagnostic dongle. In this regard, the vehicle ECU may be capable of uploading information to a remote location independent of a dongle or smartphone, while in other embodiments, the vehicle ECU may be capable of wirelessly communicating with the driver's smartphone, which may be used as a relay between the vehicle ECU and a remote destination.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for providing vehicle information to a user using audible signals, the system being configured for use with a vehicle and a mobile communication device, the system comprising:
   a data acquisition and transfer device disposable in communication with a vehicle computer on a vehicle to receive diagnostic data therefrom, the data acquisition and transfer device being configured to transmit a data request signal to the vehicle computer to request the diagnostic data in response to a determination that the vehicle is stationary, the data acquisition and transfer device including a motion sensor to detect a status of the data acquisition and transfer device as being one of a moving status and a non-moving status; and
   a remote diagnostic server disposable in communication with the data acquisition and transfer device to receive the diagnostic data therefrom, the remote diagnostic server including a plurality of preset vehicle conditions stored thereon, the remote diagnostic server being operative to analyze the diagnostic data and generate an alert signal when the diagnostic data represents at least one of the preset vehicle conditions, the mobile communication device being operative to generate an audible signal in response to receipt of the alert signal, the audible signal including diagnostic information associated with the received diagnostic data.

2. The system recited in claim 1, wherein at least one of the plurality of preset vehicle conditions stored on the remote diagnostic server includes an operable range for a vehicle operational condition.

3. The system recited in claim 2, wherein the vehicle operational condition relates to a level of gas in a gas tank on the vehicle, and the operable range includes a predefined level of gas under a maximum threshold.

4. The system recited in claim 1, wherein the remote diagnostic server is capable of determining the plurality of preset vehicle conditions based on vehicle identification information associated with the vehicle.

5. The system recited in claim 4, wherein the data acquisition device is capable of receiving the vehicle identification information from the vehicle computer and communicating the vehicle identification information to the remote diagnostic server.

6. The system recited in claim 1, wherein at least one of the plurality of preset vehicle conditions stored on the remote diagnostic server includes a preset battery level for a vehicle battery.

7. The system recited in claim 1, wherein the audible signal includes voice alerts in a prescribed language selected by a user.

8. The system recited in claim 1, further comprising voice conversion tool disposable in communication with the remote diagnostic server to receive the alert signal and convert the alert signal from a digital format to a voice format to facilitate generation of the audible signal by the mobile communication device.

9. The system recited in claim 1, wherein the data acquisition and transfer device is configured to:
   determine whether the vehicle is stationary when the data acquisition and transfer device is disposed in communication with the vehicle computer.

10. The system recited in claim 9, wherein the data acquisition and transfer device is configured to receive operational data from the vehicle computer and determine whether the vehicle is stationary based on the received operational data.

11. The system recited in claim 10, wherein the operational data is speed data from the vehicle computer.

12. The system recited in claim 9, wherein the motion sensor is configured to detect the status of the data acquisition and transfer device as being one of the moving status and the non-moving status in response to the data acquisition and transfer device being in communication with the vehicle computer.

13. The system recited in claim 12, wherein the motion sensor includes an accelerometer.

14. The system recited in claim 12, wherein the data acquisition and transfer device is operative to generate a request signal only when the motion sensor detects the status as being the non-moving status, the diagnostic data being received by the data acquisition and transfer device in response to generation of the request signal.

15. The system recited in claim 12, wherein the data acquisition and transfer device is operative to generate a request signal in response to a detected transition on the status from the moving status to the non-moving status.

16. The system recited in claim 1, wherein the data acquisition and transfer device is configured to transmit a data request signal to the vehicle computer in response to receipt of an instructional signal from the mobile communication device.

17. The system recited in claim 1, wherein the data acquisition and transfer device includes a long range communication circuit for communicating with the remote diagnostic server using a cellular network, or a short range communication circuit for communicating with the remote diagnostic server using the mobile communication device.

18. A method for providing vehicle information to a user using an audible signal, the method comprising the steps of:
    transmitting a data request signal to the vehicle computer to request the diagnostic data in response to a determination that the vehicle is stationary;
    receiving diagnostic data from a vehicle computer on a vehicle at a data acquisition and transfer device;
    transferring the diagnostic data to a remote diagnostic server having a plurality of preset vehicle conditions stored thereon;
    analyzing the diagnostic data at the remote diagnostic server and generating an alert signal when the diagnostic data satisfies at least one of the preset vehicle conditions;
    transmitting the alert signal to a mobile communication device, the mobile communication device being configured to generate the audible signal in response to receipt of the alert signal, the audible signal including diagnostic information associated with the diagnostic data received from the vehicle computer; and
    detecting a status of the data acquisition and transfer device using a sensor on the data acquisition and transfer device, the status being one of a moving status and a non-moving status.

19. The method recited in claim 18, further comprising the steps of:
    receiving vehicle identification information associated with the vehicle at the remote diagnostic server; and
    identifying certain ones of the plurality of preset vehicle conditions as vehicle specific preset conditions at the remote diagnostic server based on the received vehicle identification information.

20. The method recited in claim 18, further comprising the step of receiving the alert signal at a voice conversion tool and converting the alert signal to a voice format.

21. The method recited in claim 18, further comprising the step of:
    determining whether the vehicle is stationary.

22. The method recited in claim 21, further comprising the steps of receiving operational data from the vehicle and determining whether the vehicle is stationary based on the received operational data.

23. The method recited in claim 18, further comprising the step of generating a request signal by the data acquisition and transfer device only when the sensor detects the status as being the non-moving status, the diagnostic data being received by the data acquisition and transfer device in response to generation of the request signal.

24. The method recited in claim 18, further comprising the step of determining whether the vehicle is stationary, the transmitted alert signal including instructions to limit generation of the audible signal only when the vehicle is determined to be stationary.

25. The method recited in claim 18, wherein the transmitted alert signal is associated with one of a first indicator and a second indicator, the method further comprising the step of determining whether the vehicle is stationary, the generation of the audible signal being limited to when the vehicle is stationary when the alert signal is associated with the first indicator, the generation of the audible signal proceeding independent of the determination of whether the vehicle is stationary when the alert signal is associated with the second indicator.

26. A diagnostic method for use with a vehicle having an electronic control unit (ECU) in communication with a plurality of vehicle systems, the vehicle being operable so as to be associated with a moving status when the vehicle is moving and a non-moving status when the vehicle is stationary, the diagnostic method comprising the steps of:
    establishing an initial data link between a diagnostic data acquisition and transfer device (DAT) having a diagnostic data processor and the ECU using a diagnostic port on the vehicle;
    transmitting a request from the DAT to the ECU using the initial data link for a systems list including the plurality of vehicle systems from the ECU;
    establishing a system data link between the DAT and a vehicle system of interest, the vehicle system of interest being one of the plurality of vehicle systems included on the systems list;
    receiving initial status data at the diagnostic data processor, the initial status data being associated with operation of the vehicle;
    analyzing the initial status data using the diagnostic data processor to determine an operational status of the vehicle as being one of the moving status and the non-moving status;
    terminating the system data link when the operational status is determined to be the moving status;
    receiving subsequent status data at the diagnostic data processor, the subsequent status data being associated with operation of the vehicle subsequent to receipt of the initial status data;
    analyzing the subsequent status data using the diagnostic data processor to determine the operational status of the vehicle as being one of the moving status and the non-moving status; and
    re-establishing the system data link when the operational status is determined to be the non-moving status based on the analysis of the subsequent status data.

27. The diagnostic method recited in claim 26, further comprising the step of receiving vehicle identification information from the ECU in response to establishing the initial data link.

28. The diagnostic method recited in claim 26, wherein the steps of establishing an initial data link to re-establishing the system data link proceed independent of user intervention.

29. The diagnostic method recited in claim 26, further comprising the step of determining the vehicle system of interest based on a predetermined ranking of the plurality of vehicle systems.

30. The diagnostic method recited in claim 26, further comprising the steps of:
    receiving a system data stream from the vehicle system of interest using the system data link while the system data link is established; and
    temporarily storing the received system data stream in a buffer database while the system data link is terminated.

31. The diagnostic method recited in claim 30, further comprising the steps of:
    creating a digital marker representative of that portion of the system data stream already received using the system data link prior to termination of the system data link; and
    generating a resume command based on the digital marker to resume the step of receiving the system data stream to receive a remaining portion of the system data stream yet to be received.

32. The diagnostic method recited in claim 30, further comprising the step of uploading at least a portion of the system data stream to a remote diagnostic server.

33. The diagnostic method recited in claim 32, further comprising the step of receiving, from the remote diagnostic server, a possible diagnostic solution associated with at least a portion of the system data stream.

34. The diagnostic method recited in claim 33, further comprising the step of converting the possible diagnostic solution into an audible signal to be broadcast to a user.

35. The diagnostic method recited in claim 34, wherein the step of establishing an initial data link and all steps subsequent thereto proceed autonomously in response to receipt by the DAT of a power signal from the ECU.

36. The diagnostic method recited in claim 33, further comprising the step of requesting live data from the ECU to verify the possible diagnostic solution.

37. The diagnostic method recited in claim 33, further comprising the step of transmitting the possible diagnostic solution to a preprogrammed electronic address.

38. The diagnostic method recited in claim 26, further comprising the step of requesting at least one of the initial status data and subsequent status data according to a preset schedule.

39. The diagnostic method recited in claim 26, further comprising the step of receiving a voice request from a user, and requesting at least one of the initial status data and the subsequent status data in response to receiving the voice request.

40. The diagnostic method recited in claim 39, wherein all steps subsequent to the receipt of the voice request proceed autonomously in response to receipt of the voice request.

41. The diagnostic method recited in claim 26, wherein the step of receiving initial status data includes receiving at least one of data from a microphone, data from a GPS module, and data from an accelerometer.

* * * * *